US011510144B2

(12) United States Patent
Hong et al.

(10) Patent No.: US 11,510,144 B2
(45) Date of Patent: *Nov. 22, 2022

(54) ELECTRONIC SYSTEMS AND ELECTRONIC DEVICES

(71) Applicant: Samsung Electronics Co., Ltd., Suwon-si (KR)

(72) Inventors: Sung-taek Hong, Seoul (KR); Kwan-yong Jin, Hwaseong-si (KR); Byoung-sul Kim, Suwon-si (KR); Sang-hoon Lee, Hwaseong-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 18 days.

This patent is subject to a terminal disclaimer.

(21) Appl. No.: 17/157,129

(22) Filed: Jan. 25, 2021

(65) Prior Publication Data

US 2021/0144643 A1 May 13, 2021

Related U.S. Application Data

(63) Continuation of application No. 15/332,606, filed on Oct. 24, 2016, now Pat. No. 10,904,833.

(30) Foreign Application Priority Data

Nov. 17, 2015 (KR) .................. 10-2015-0161048

(51) Int. Cl.
H04W 52/02 (2009.01)
H02J 7/00 (2006.01)
H01M 10/44 (2006.01)

(52) U.S. Cl.
CPC ... *H04W 52/0229* (2013.01); *H04W 52/0235* (2013.01); *Y02D 30/70* (2020.08)

(58) Field of Classification Search
None
See application file for complete search history.

(56) References Cited

U.S. PATENT DOCUMENTS 6,229,287 B1* 5/2001 Ferris ............... H02J 7/342
320/141
7,133,703 B2* 11/2006 Aoshima ........... H01M 50/569
455/418

(Continued)

FOREIGN PATENT DOCUMENTS

JP 2013-37673 A 2/2013
KR 10-2001-0071761 7/2001

(Continued)

OTHER PUBLICATIONS

Non-Final Office Action dated Dec. 13, 2018 in U.S. Appl. No. 15/332,606.

(Continued)

*Primary Examiner* — Pablo N Tran
(74) *Attorney, Agent, or Firm* — Harness, Dickey & Pierce, P.L.C.

(57) ABSTRACT

An electronic system electronic device includes: an internal battery, an external battery, a memory and a plurality of function modules. The internal battery is configured to generate a first power signal. The external battery is configured to be separated from the electronic device, and to generate a second power signal. The memory is configured to operate based on the first power signal. The plurality of function modules are configured to operate based on the second power signal.

20 Claims, 19 Drawing Sheets

(56) References Cited

U.S. PATENT DOCUMENTS

| | | | |
|---|---|---|---|
| 7,449,864 B2 * | 11/2008 | Kwon | H02J 7/0047 |
| | | | 320/132 |
| 7,834,581 B2 | 11/2010 | Kim et al. | |
| 7,915,862 B2 | 3/2011 | Kim et al. | |
| 7,919,885 B2 | 4/2011 | Woo | |
| 8,264,198 B2 | 9/2012 | Sato et al. | |
| 8,692,518 B2 * | 4/2014 | Uchida | G04C 10/04 |
| | | | 320/132 |
| 8,952,650 B2 | 2/2015 | Lee | |
| 8,984,312 B2 | 3/2015 | Koshimizu | |
| 9,438,058 B2 | 9/2016 | Degura et al. | |
| 10,003,109 B2 | 6/2018 | Kim et al. | |
| 10,686,230 B2 * | 6/2020 | Colasacco | H01M 10/48 |
| 2007/0035279 A1 | 2/2007 | Kwon et al. | |
| 2008/0106232 A1 | 5/2008 | Idzik et al. | |
| 2009/0153358 A1 | 6/2009 | Park et al. | |
| 2011/0009172 A1 | 1/2011 | Song et al. | |
| 2011/0089764 A1 | 4/2011 | Woo | |
| 2014/0356667 A1 | 12/2014 | Kim | |
| 2014/0357094 A1 | 12/2014 | Kim | |
| 2016/0373870 A1 | 12/2016 | Kang et al. | |

FOREIGN PATENT DOCUMENTS

| | | | |
|---|---|---|---|
| KR | 10-2009-0020837 A | | 2/2009 |
| KR | 10-1050332 B1 | | 7/2011 |
| KR | 10-2011-0136327 A | | 12/2011 |
| KR | 10-1142647 B1 | | 5/2012 |
| KR | 10-1420090 B1 | | 7/2014 |
| KR | 10-2014-0142639 A | | 12/2014 |
| KR | 10-1474446 B1 | | 12/2014 |

OTHER PUBLICATIONS

Final Office Action dated Jul. 10, 2019 in U.S. Appl. No. 15/332,606.
Non-Final Office Action dated Nov. 8, 2019 in U.S. Appl. No. 15/332,606.
Final Office Action dated May 4, 2020 in U.S. Appl. No. 15/332,606.
Notice of Allowance dated Sep. 23, 2020 in U.S. Appl. No. 15/332,606.
Non-Final Office Action dated Oct. 3, 2022 in U.S. Appl. No. 17/157,079.

* cited by examiner

ELECTRONIC SYSTEMS AND ELECTRONIC DEVICES

CROSS-REFERENCE TO RELATED APPLICATIONS

This application is a Continuation Application of U.S. application Ser. No. 15/332,606, filed on Oct. 24, 2016, which claims priority under 35 U.S.C. § 119(a) to Korean Patent Application No. 10-2015-0161048, filed on Nov. 17, 2015, in the Korean Intellectual Property Office (KIPO), the entire contents of all of which are incorporated herein in its entirety by reference.

BACKGROUND

1. Field

Example embodiments of inventive concepts relate to electronic systems and/or electronic devices, which include memory.

2. Description of Related Art

Recently, mobile electronic devices such as computers, tablet personal computers (PCs), smartphones, or wearable electronic devices have advanced in functionality and become more compact in size. Accordingly, there is a demand for increasing a capacity of a battery that supplies power to the mobile electronic device for a longer duration, and slimming the battery down such that the battery is lighter in weight and more portable.

An internal battery embedded in an electronic device is relatively small and may relatively stable supply power to the electronic device. However, if the battery becomes obsolete, it may be inconvenient to replace the battery in the electronic device. An external battery that is detachably attached to an electronic device may be more easily replaced. However, since the external battery may unintentionally separate from the electronic device by falling off, or an external shock to the electronic device, a sudden power-off may occur in the electronic device.

SUMMARY

Example embodiments of inventive concepts provide electronic systems and electronic devices, which may suppress and/or prevent data loss and normally operate, even if an external battery is separated from an electronic system, and/or the electronic device is discharged.

According to an example embodiment of inventive concepts, there is provided an electronic device including: an internal battery configured to generate a first power signal; an external battery detachably attached to the electronic device, the external battery configured to generate a second power signal; a memory configured to operate based on the first power signal; and a plurality of function modules configured to operate based on the second power signal.

According to another example embodiment of inventive concepts, there is provided an electronic system, comprising, a memory configured to receive a first power signal generated by an internal battery embedded in the electronic device, and store data; and a plurality of function modules configured to operate based on a second power signal, the second power signal generated by an external battery, the external battery configured to be separated from the electronic device, wherein, the memory and at least one function module of the plurality of function modules are configured to operate based on the first power signal if the external battery is discharged or separated from the electronic device.

According to another example embodiment of inventive concepts, there is provided an electronic device, comprising: a removable first power supply configured to supply power to the electronic device when the electronic device operates in a first power mode; an internal second power supply configured to supply power to the electronic device when the electronic device operates in the first power mode and a second power mode; and one or more processors configured to execute computer readable instructions to switch the electronic device from the first power mode to the second power mode in response to (i) interruption of the power supply from the removable first power supply to the electronic device, or (ii) detecting that the charge of the removable first power supply has fallen below a threshold value; wherein the operating frequency of the second power mode is less than the operating frequency of the first power mode.

BRIEF DESCRIPTION OF THE DRAWINGS

Example embodiments of inventive concepts will be more clearly understood from the following detailed description taken in conjunction with the accompanying drawings in which.

DETAILED DESCRIPTION OF EXAMPLE EMBODIMENTS

Figure 1:
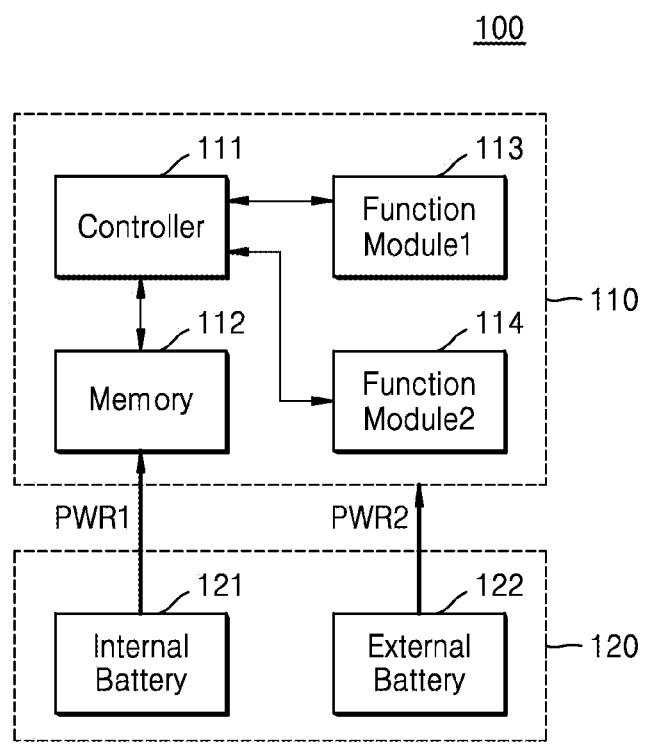
FIG. 1 is a block diagram of an electronic device according to an example embodiment.

According to example embodiments, an electronic system may be equipped in a mobile electronic device. For example, a mobile electronic device may include at least one selected from the group consisting of a smartphone, a tablet personal computer (PC), a mobile phone, a video phone, an e-book reader, a desktop PC, a laptop PC, a netbook computer, a personal digital assistant (PDA), a portable multimedia player (PMP), a moving pictures expert group audio layer 3 (MP3) player, a mobile medical device, a camera, and a wearable device (for example, a head-mounted device (HMD) such as electronic glasses, electronic clothes, an electronic bracelet, an electronic necklace, an electronic accessory, an electronic tattoo, a smart watch, and/or the like).

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Hereinafter, according to one or more example embodiments, an electronic system and an electronic device will be described in detail with reference to the accompanying drawings. The term, 'user' may refer to a person who uses an electronic system, or a device that uses the electronic system (for example, an artificial intelligence (AI) electronic device).

FIG. 1 is a block diagram of an electronic device 100 according to an example embodiment.

Referring to FIG. 1, the electronic device 100 may include a system 110 for performing a function of the electronic device 100, and a power supplier 120 for supplying power to the system 110.

The system 110 may include a controller 111, a memory 112, and a plurality of function modules 113 and 114.

The controller 111 may control for example all operations of the electronic device 100 and perform a power control function. The controller 111 may control other elements of the electronic device 100, such as the memory 112 and the plurality of function modules 113 and 114, by driving an operating system and/or an application program. Additionally, the controller 111 may perform various processing and operations on various data such as multimedia data.

The controller 111 may be a processor, an application processor, a multimedia processor, an integrated multimedia processor, and/or the like, and may be implemented as an integrated circuit (IC) and/or a system-on-chip (SoC).

Still referring to FIG. 1, the memory 112 may store data such as a control command code, control data, or the like, which is needed to operate the electronic device 100, and/or user data. The memory 112 may include at least one selected from the group including a volatile memory and a non-volatile memory. The volatile memory, for example, may include at least one selected from various memories such as, but not limited to, dynamic random access memory (DRAM), static RAM (SRAM), synchronous DRAM (SDRAM), phase-change RAM (PRAM), magnetic RAM (MRAM), resistive RAM (RRAM), ferroelectric RAM (FeRAM), and the like. The non-volatile memory, for example, may include at least one selected from various memories such as read only memory (ROM), programmable ROM (PROM), electrically programmable ROM (EPROM), electrically erasable and programmable ROM (EEPROM), flash memory, PRAM, MRAM, RRAM, FeRAM, and the like. Additionally, the non-volatile memory, for example, may include at least one selected from non-volatile memory devices such as a solid-state disk (SSD), an embedded multimedia card (eMMC), and a universal flash storage (UFS).

The plurality of function modules 113 and 114 are independent elements performing particular functions from among various functions of the electronic device 100. According to example embodiments, a function module may refer to either (i) hardware (or a hardware component) configured to perform a particular function and/or operation, (ii) a software (or a software component) for performing a particular function and/or operation upon execution by a processor, and/or, (iii) an electronic recording medium (e.g., a central processing unit (CPU), a compact disc (CD), a flash drive, etc.) in which a computer program code is installed. The electronic recording medium may perform a particular function and/or operation upon execution of the computer program code by the processor. However, the plurality of function modules 113 and 114 is not limited thereto, and may refer to hardware or a functional and/or structural combination of software for driving hardware.

For example, the plurality of functional modules 113 and 114 may include a communication module, an input/output module, a display module, an interface, a sensor module, an audio module, a camera module, or the like. Additionally, a sub-module included in the communication module, the input/output module, the display module, the interface, the sensor module, the audio module, the camera module, or the like, may be referred to as one of the plurality of function modules 113 and 114. For example, a module included in the audio module such as including but not limited to a speaker, a receiver, an earphone, a microphone, or the like; a cellular module included in the communication module (e.g., a long-range communication module such as a long-term evolution (LTE) module, a code division multiple access (CDMA) module, or the like); a wireless fidelity (Wi-Fi) module; a Bluetooth module; a near field communication (NFC) module, or the like may be referred to as one of the plurality of function modules 113 and 114.

According to an example embodiment, the controller 111 and the memory 112 may also be referred to as one of the plurality of modules 113 and 114. FIG. 1 shows two function modules 113 and 114. However, example embodiments are not limited thereto, and a number and type of the plurality of function modules 113 and 114 may vary depending on the functions performed by the electronic device 100.

Still referring to FIG. 1, the power supplier 120 may include an internal battery 121 (i.e., an internal power supply) and an external battery 122 (i.e., a removable power supply). The internal battery 121 is a battery that may be embedded into the electronic device 100, and thus, may not be easily attached to and/or detached from the electronic device 100. For example, the internal battery 121, together with the system 110, may be built in a housing of the electronic device 100. According to an example embodiment, the internal battery 121 may be equipped on a main board, in which the system 110 is equipped, or a printed circuit board (PCB), and/or directly connected to the main board or the PCB.

The external battery 122 is a battery that may be more easily attached to and/or detached from the electronic device 100, and may be equipped outside the housing of the electronic device 100. According to an example embodiment, the external battery 122 may be electrically connected to the system 110 via a socket included in the housing.

According to an example embodiment, the external battery 122 is a main power supply to the electronic device 100, and the internal battery 121 may operate as an auxiliary power supply to the electronic device 100. A capacity of the internal battery 121 may be less than a capacity of the external battery 122.

According to an example embodiment, the internal battery 121 supplies power to the memory 112, or one or more function blocks that include the memory 112. The external battery 122 may supply power to the system 110 or function blocks that do not receive power from the internal battery 121, from among function blocks included in the system 110.

According to an example embodiment, the internal battery 121 may supply power to the memory 112, and the external battery 122 may supply power to function modules other than the memory 112. The function modules included in the system 110, for example, the controller 111 and the plurality of function modules 113 and 114.

According to an example embodiment, the internal battery 121 may supply power to the memory 112 and one or more function modules, and the external battery 122 may supply power to other function modules. For example, the internal battery 121 may supply power to the memory 112 and the controller 111, and the external battery 122 may supply power to a first functional module 113 and a second functional module 114.

Accordingly, the memory 112 or one or more function modules including the memory 112 may operate based on first power PWR1 supplied from the internal battery 121, and other function modules included in the system 110, such as the function modules 113 and 114, may operate based on second power PW2 provided by the external battery 122.

According to an example embodiment, the external battery 122 may charge the internal battery 121.

The internal battery 121 is fixed to the electronic device 100 so as to more stably supply power to the electronic device 100. Since the external battery 122 may be more easily attached to and/or detached from the electronic device 100, the external battery 122 may be freely replaced by another battery. If the external battery 122 is discharged, a user may easily charge the external battery 122 by separating the external battery 122 from the electronic device 100. If the external battery 122 becomes obsolete, the external battery 122 may be replaced by a new external battery.

As described above, still referring to FIG. 1, according to an example embodiment, in the electronic device 100, the system 110 operates mainly based on the second power PWR2 supplied from the external battery 122, and the memory 112 and/or one or more function modules including the memory 112 may operate based on the first power PWR1 provided by the internal battery 121. Since the memory 112 or the one or more function modules including the memory 112 may receive power supply from the internal battery 121, the memory 112 or the one or more function modules including the memory 112 may operate more stably. Even if the external battery 122 is separated from the electronic device 100 due to falling of the electronic device 100, and/or the electronic device 100 experiences an external shock, a sudden power off of the electronic device 100 and the data loss in the memory 112 may be suppressed and/or prevented since the memory 112 and/or the one or more function blocks including the memory 112 may operate more stably.

Figure 2:
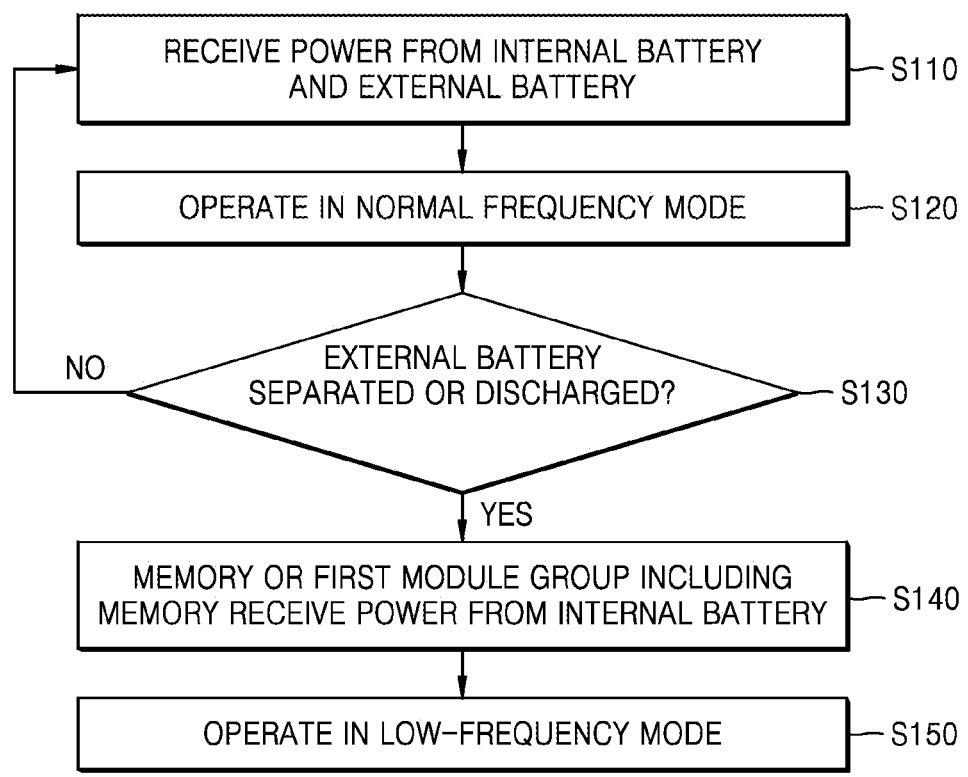
FIG. 2 is a flowchart of a method of operating an electronic system according to an example embodiment.

FIG. 2 is a flowchart of a method of operating an electronic system according to an example embodiment. FIG. 2 shows a method of operating the system 110 included in the electronic device 100 shown in FIG. 1.

Referring to FIGS. 1 and 2, and more particularly with reference to FIG. 2, at S110, the system 110 receives power supply from the internal battery 121 and the external battery 122. According to an example embodiment, the memory 112 may receive the first power PWR1 from the internal battery 121; and the controller 111, the first function module 113, and the second function module 114 may receive the second power PWR2 from the external battery 122. According to another example embodiment, the memory 112 and a first module group that includes at least one function module of the plurality of function modules 113, 114 may receive the first power PWR1 from the internal battery 121, and other function modules (referred to as a second module group) of the plurality of function modules 113, 114 may receive the second power PWR2 from the external battery 122.

At S120, the system 110 may operate in a normal frequency mode. In other words, for example, the system 110 may operate normally. That is, each function module, for example, the controller 111, the memory 112, the first function module 113, and the second function module 114 may operate in a given predetermined (or alternatively, desired) frequency mode, respectively.

At S130, the controller 111 may determine whether the external battery 122 is separated from the electronic device 100, or whether the external battery 122 is discharged. According to an example embodiment, the controller 111 may monitor states of the external battery 122 and the internal battery 121. The controller 111 may determine states of the external battery 122 and the internal battery 121 (e.g., the states of the external battery 122 and the internal battery 121 may include the remaining battery charge, a state when the external battery 122 is attached to and/or detached from the electronic device 100, or the like) based on a power and/or state signal provided by the external battery 122 and the internal battery 121. According to another example embodiment, the controller 111 may determine states of the external battery 122 and the internal battery 121 based on a state signal provided by a power manager (not shown) for monitoring the states of the external battery 122 and the internal battery 121.

If the external battery 122 is separated from the electronic device 100 or discharged, then at S140 the memory 112 or the first module group that includes the memory 112 may receive power from the internal battery 121, and the memory 112 or the first module group that includes the memory 112 may operate in a low-power mode. At S150, the memory 112 or the first module group that includes the memory 112 may operate in a low-frequency mode.

According to an example embodiment, function modules, which receive power from the internal battery 121 at S140, may be the same as function modules that receive power from the internal battery 121 at S110. For example, the memory 112 and the controller 111 may receive the first power PWR1 from the internal battery 121 at S110, and the memory 112 and the controller 111 may receive the first power PWR1 from the internal battery 121 at S140.

Still referring to FIG. 2, according to another example embodiment, function modules, which receive power from the internal battery 121 at S140, may be different from function modules that receive power supply from the internal battery 121 at S110. For example, the memory 112 and the controller 111 may receive the first power PWR1 from the internal battery 121 at S110, and the memory 112, the controller 111, and at least one function module may receive the first power PWR1 from the internal battery 121. The at least one function module may be a given predetermined (or alternatively, desired) function module and/or a function module that operates when the external battery 122 is separated from the electronic device 100 or when the external battery 122 is discharged.

In an example embodiment, even if the external battery 122 is separated from the electronic device 100 or if the external battery 122 is discharged, since the memory 112 or the first module group that includes the memory 112 operates based on the first power PWR1 supplied from the internal battery 121, the data loss may be suppressed and/or prevented, and a given predetermined (or alternatively, desired) function of the electronic device 100 may be performed, and/or alternatively an operation that was being performed by the electronic device 100 may be maintained.

Additionally, if power is supplied only from the internal battery 121, since the system 110 operates in a low-frequency mode, power consumption may be reduced, and thus, a time period for which the system 110 may operate may increase.

Figure 3:
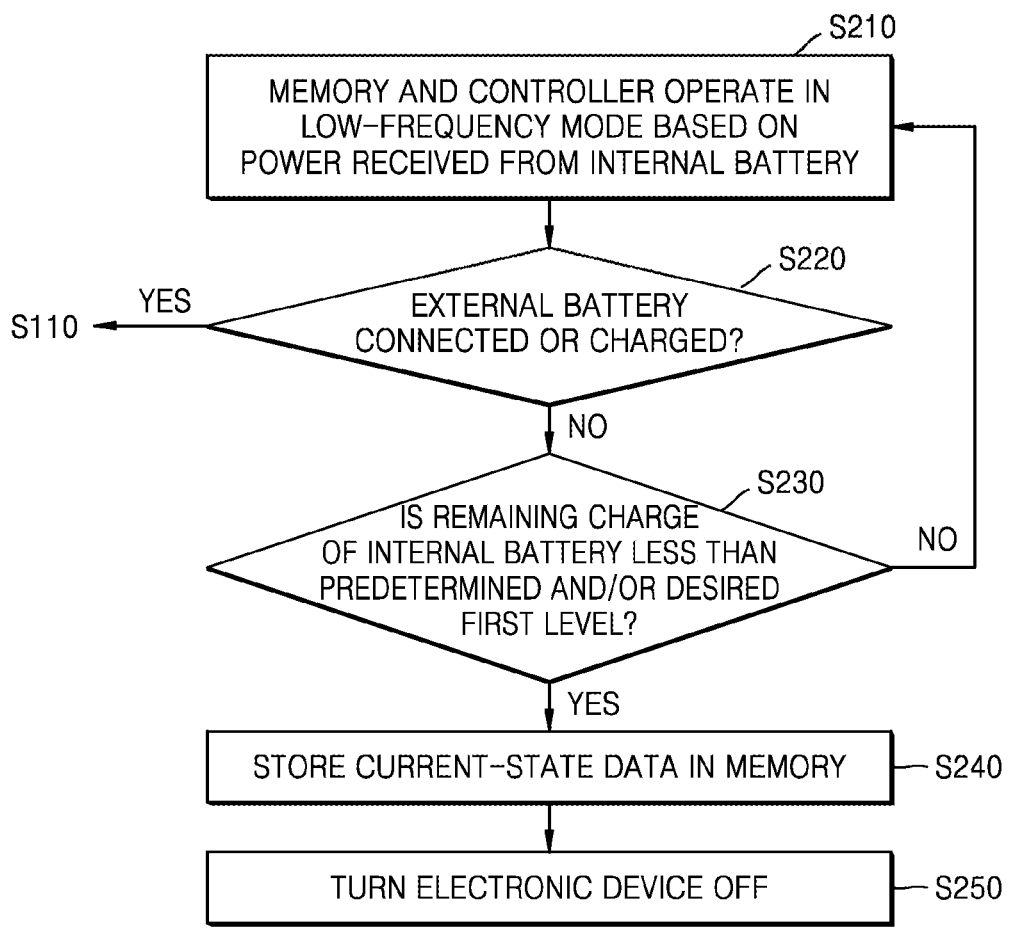
FIG. 3 is a flowchart of a method of operating an electronic system according to another example embodiment.

FIG. 3 is a flowchart of a method of operating an electronic system according to an example embodiment. The method of operating an electronic system, described with reference to FIG. 3, is an example embodiment of a method of operating the system 110 if the external battery 122 is separated from the electronic device 100 or discharged. In the method of FIG. 3, the memory 112 and the controller 111 receive power from the internal battery 121.

Referring to FIG. 3, the memory 112 and the controller 111 may operate based on the first power PWR1 received from the internal battery 121.

At S210 the memory 112 and the controller 111 may operate in a low-frequency mode.

At S220, the controller 111 may determine whether the external battery 122 is attached to the electronic device 100, and/or whether the external battery 122 is being charged. If the external battery 122 is attached to the electronic device 100 and/or is charged to a threshold level, the system 110 may operate by using the power received back from the internal battery 121 and the external battery 122, as shown at S110 of FIG. 2. The system 110 may operate in a normal frequency mode. For example, the system 110 may return to a state before the external battery is separated from the electronic device 100 or discharged, and then, operate.

If the external battery 122 is not attached to the electronic device 100 and/or the external battery 122 is not charged, the controller 111, at S230, may monitor a remaining charge of the internal battery 121, and determine whether the remaining charge of the internal battery 121 is less than a given predetermined (or alternatively, desired) first level.

If the remaining charge of the internal battery 121 is equal to or greater than the given predetermined (or alternatively, desired) first level, the memory 112 and the controller 111 may continue to operate.

If the remaining charge of the internal battery 121 is less than the given predetermined (or alternatively, desired) first level, the memory 112 may store data of the system 110 (or the electronic device 100) in a current state. At S240, the memory 112 may store the data under control by the controller 111. The memory 112 may store various operation data obtained by driving an operating system (OS) or an application of the controller 111, multimedia data, and/or received user data. According to an example embodiment, the memory 112 may include volatile memory (e.g., DRAM or SRAM) that operates as a main memory of the system 110, and a non-volatile memory (e.g., flash memory, an embedded multimedia card (eMMC), an SDD, or the like). The non-volatile memory operates as a storage device and stores data, which is processed by and temporarily stored in the volatile memory.

Then, at S250, the controller 111 may turn the electronic device 100 off.

In an example embodiment, the system 110 may monitor a remaining charge of the internal battery 121 so as to suppress and/or prevent a sudden power-off that may be caused by discharging of the internal battery. If the remaining charge of the internal battery 121 is determined as being insufficient to operate the system 110, then the system 110 stores data in a current state in a memory, and thus, suppress and/or prevent data loss.

Figure 4:
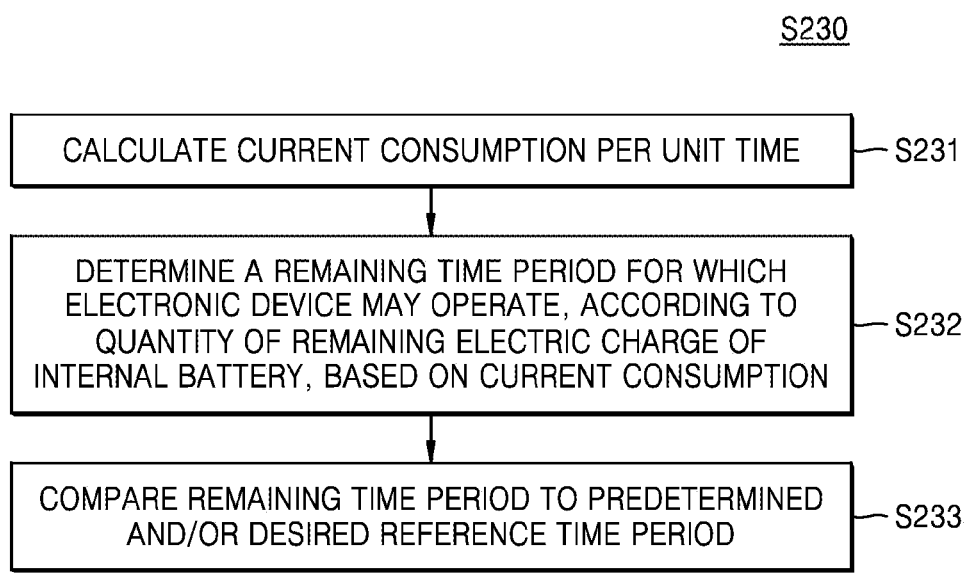
FIG. 4 is a flowchart of a method of determining a remaining charge of an internal battery according to an example embodiment.

FIG. 4 is a flowchart for explaining an example embodiment of the determining of remaining battery charge at S230 in FIG. 3.

In determining of a remaining charge of the internal battery 121 in S230a, the system 110 may determine a time period for which the system 110 may operate based on the quantity of the remaining electric charge, and thus, determine whether the time period for which the internal battery 121 may operate is less than a given predetermined (or alternatively, desired) reference time period.

Referring to FIG. 4, at S231 the controller 111 may calculate current consumption per unit time, and calculate the quantity of remaining electric charge of the internal battery 121 based on the calculated current consumption. At S232 the controller 111 may determine a remaining time period for which the system 110 (or the electronic device 100) may operate based on the quantity of the remaining electric charge of the internal battery 121.

At S233, the controller 111 may compare the remaining time period to the given predetermined (or alternatively, desired) reference time period. Thus, it may be determined whether the remaining charge of the internal battery 121 is sufficient to operate the system 110.

Figure 5A:
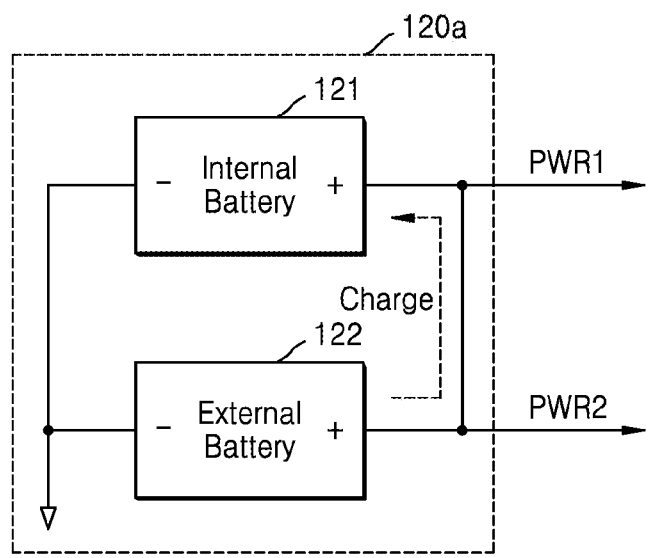
FIGS. 5A and 5B illustrate block diagrams for charging an internal battery by an external battery according to an example embodiment.
Figure 5B:
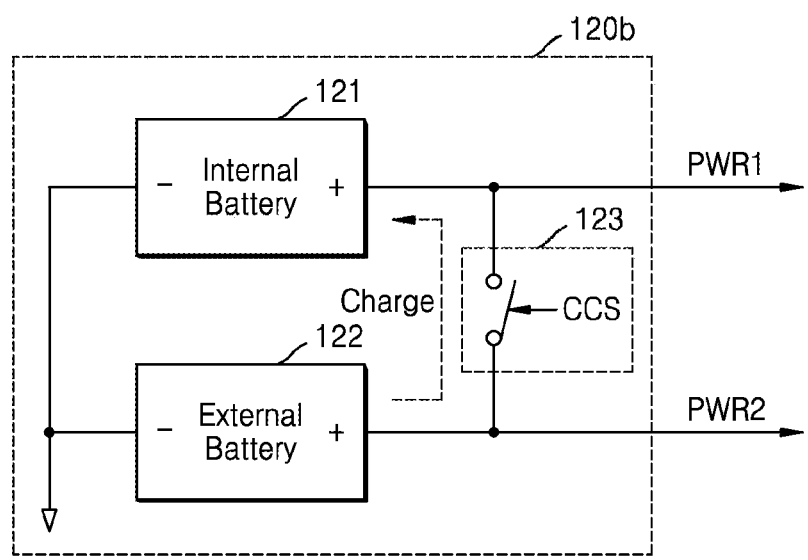
Figure 5C:
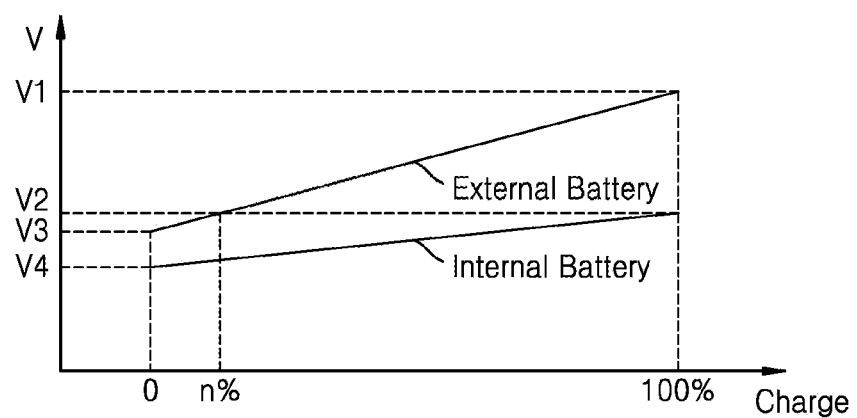
FIG. 5C is a graph showing example voltage levels of the internal battery and the external battery.

FIGS. 5A and 5B illustrate diagrams for explaining a method of charging the internal battery 121 by the external battery 122. FIG. 5C is a graph showing voltage levels of the internal battery 121 and the external battery 122.

Referring to FIGS. 5A and 5B, the internal battery 121 and the external battery 122 may be connected to each other in parallel. If the electronic device 100 operates normally, that is, for example, if the electronic device 100 operates by receiving power from the internal battery 121 and the external battery 122, then the external 122 and the internal battery 121 may charge each other.

Referring to FIG. 5C, a voltage level V1 may be obtained when the external battery 122 is fully charged, and a voltage level V3 may be obtained when the external battery 122 is discharged. A voltage level V2 may be obtained when the internal battery 121 is fully charged, and a voltage level V4 may be obtained when the internal battery 121 is discharged. The voltage level V1 may be higher than the voltage level V2. Accordingly, if the electronic device 100 operates normally, the external battery 122 may charge the internal battery 121.

According to an example embodiment, a voltage level may be obtained when a charge capacity of the external battery 122 is equal to or less than n % (e.g., 50%) of a full-charge capacity of the external battery 122. The voltage level of the external battery 122 obtained when the charge capacity of the external battery 122 is equal to or less than n % may be lower than the voltage level V4 obtained when the internal battery 121 is in a full-charge state. In an example embodiment, the internal battery 121 may charge the external battery 122.

Referring back to FIG. 5A, a voltage level of the external battery 122 may be higher than a voltage level of the internal battery 121, and the external battery 122 and the internal battery 121 may be connected to each other in parallel. Accordingly, the external battery 122 may charge the internal battery 121.

Referring back to FIG. 5B, a voltage supplier 120b may include a charge controller 123. The charge controller 123 may control a parallel connection between the internal battery 121 and the external battery 122, in response to a charge control signal CCS.

According to an example embodiment, the charge control signal CCS may be provided by the controller 111 as shown in FIG. 1. The controller 111 may monitor a remaining charge of the internal battery 121 and the external battery 122, and may generate the charge control signal CCS for controlling the external battery 122 to charge the internal battery 121 if a value of the remaining charge of the internal battery 121 is equal to or less than a given predetermined (or alternatively, desired) threshold value.

According to another example embodiment, the electronic device 100 may include a power manager (not shown) that is an independent function module for managing power, and a charge control signal CCS may be provided by the power manager.

Figure 6A:
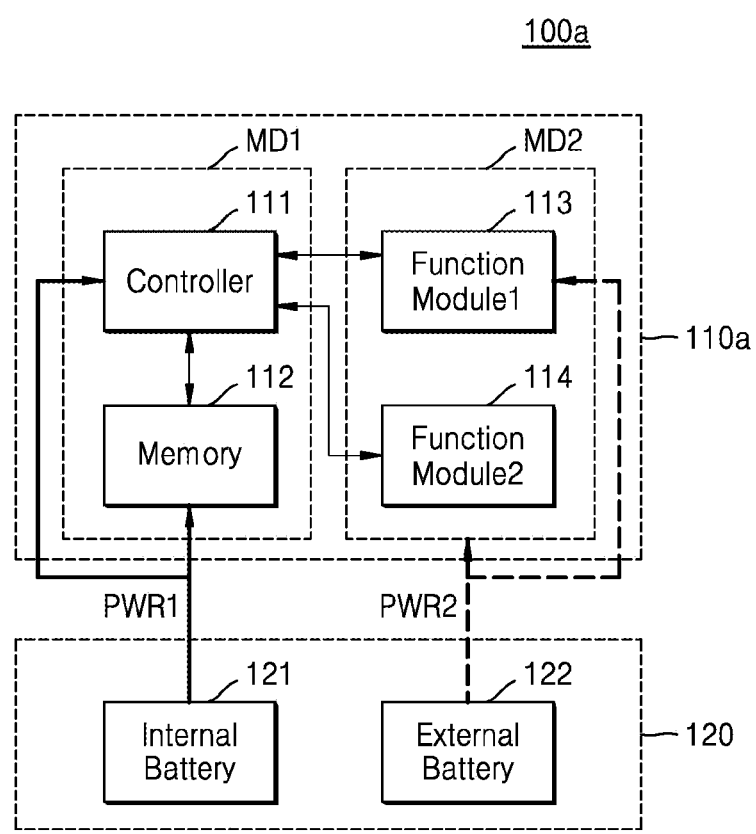
FIGS. 6A and 6B are block diagrams for showing the electronic device and example operation of the electronic device, according to an example embodiment.
Figure 6B:
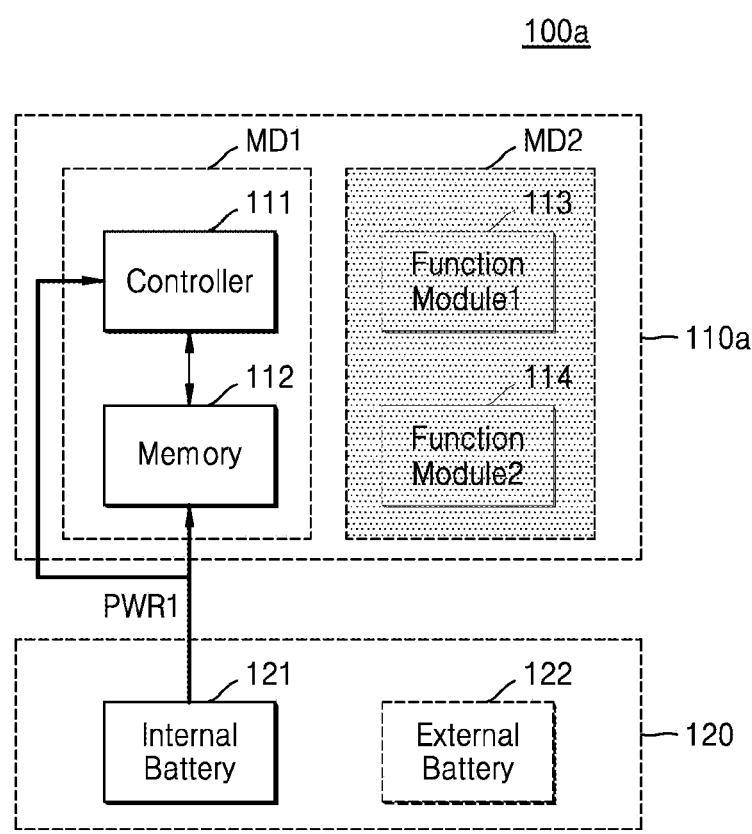

FIGS. 6A and 6B are block diagrams for showing an electronic device 100a and example operation of the electronic device 100a, according to an example embodiment. The electronic device 100a shown in FIGS. 6A and 6B is an example embodiment of the electronic device 100 shown in FIG. 1. A description provided with reference to FIGS. 1 through 5C may also be applied to the electronic device 100a and the operation of the electronic device 100a, shown in and described with reference to FIGS. 6A and 6B.

FIG. 6A shows a power supply state and example operation of a system 110a when the external battery 122 is attached to the electronic device 100a, that is, when the system 100a operates normally.

FIG. 6B shows a power supply state and example operation of the system 110a when the external battery 122 is detached from the electronic device 100a.

Referring back to FIG. 6A, a plurality of function modules 111 through 114, included in the system 110a, may be classified into a first module group MD1 and a second module group MD2 according to functions thereof. In the example embodiment, the first group module MD1 may include function modules that need to operate in real time so that the electronic device 100 performs an operation. The first module group MD1 may be referred to as a real time module. As shown in FIG. 6A, the first module group MD1 may include the controller 111 and the memory 112. According to example embodiments, the first module group MD1 may further include at least one other function module, in addition to the controller 111 and the memory 112.

The second module group MD2 shown in FIG. 6A may include function modules that do not cause disability when a main function of the electronic device 100a is performed, even if operation of the function modules temporarily stops, and do not cause a delay in operation of the electronic device 100a when the electronic device 100a operates afterwards. The second module group MD2 may be referred to as a non-real-time module.

A function module included in the first module group MD1 and a function module included in the second module group MD2 may be determined according to a main function of the electronic device 100a. According to example embodiments, function modules included in the first module group MD1 and the second module group MD2, respectively, may be predetermined when the electronic device 100a is manufactured, or predetermined when the electronic device 100a is initialized, and/or when an environment of the electronic device 100a is set.

For example, if the electronic device 100a is a smartphone, the first module group MD1 may include a controller (which may be an application processor), a memory, an input module, a display module, a long-range communication module, or the like. The second module group MD2 may include an earphone module, a sensor module, an interface, a short-range communication module (e.g., Bluetooth, NFC, or the like), or the like. However, the modules described above are only examples, and function modules included in the first module group MD1 and the second module group MD2 may be determined according to the power consumption of each function module, a frequency of using each function module, a main function of the smartphone, or the like.

Still referring to FIG. 6A, the internal battery 121 supplies first power PWR1 to the first module group MD1, and the external battery 122 supplies second power PWR2 to the second module group MD2. Accordingly, the first module group MD1 may operate based on the first power PWR1 received from the internal battery 121, and the second module group MD2 may operate based on the second power PWR2 received from the external battery 122.

Referring to FIG. 6B, if the external battery 122 is separate from the electronic device 100a or if the external battery 122 is completely discharged, power is not supplied to the second module group MD2. Accordingly, operation of the second module group MD2 stops.

However, the internal battery 121 may continue to supply the first power PWR1 to the first module group MD1. The first module group MD1 may operate based on the first power PWR1. Accordingly, even if the external battery 122 is unexpectedly removed or discharged, since the first module group MD1 that receives the first power PW1 from the internal battery 121, that is, the real-time modules that include the memory 112 continue to operate, an interrupt to the electronic device 100a may be minimized, and as such data loss of the electronic device 100a may be suppressed and/or prevented.

According to example embodiments, the first module group MD1 may operate in a low-power mode, for example, in a low-frequency mode so as to increase a time period for which the electronic device 100a may operate. Additionally, if a remaining charge of the internal battery 121 is less than a given predetermined (or alternatively, desired) first threshold level, the memory 112 may store data in a current state under control by the controller 111, and a power of the electronic device 100 may be turned off.

Figure 7:
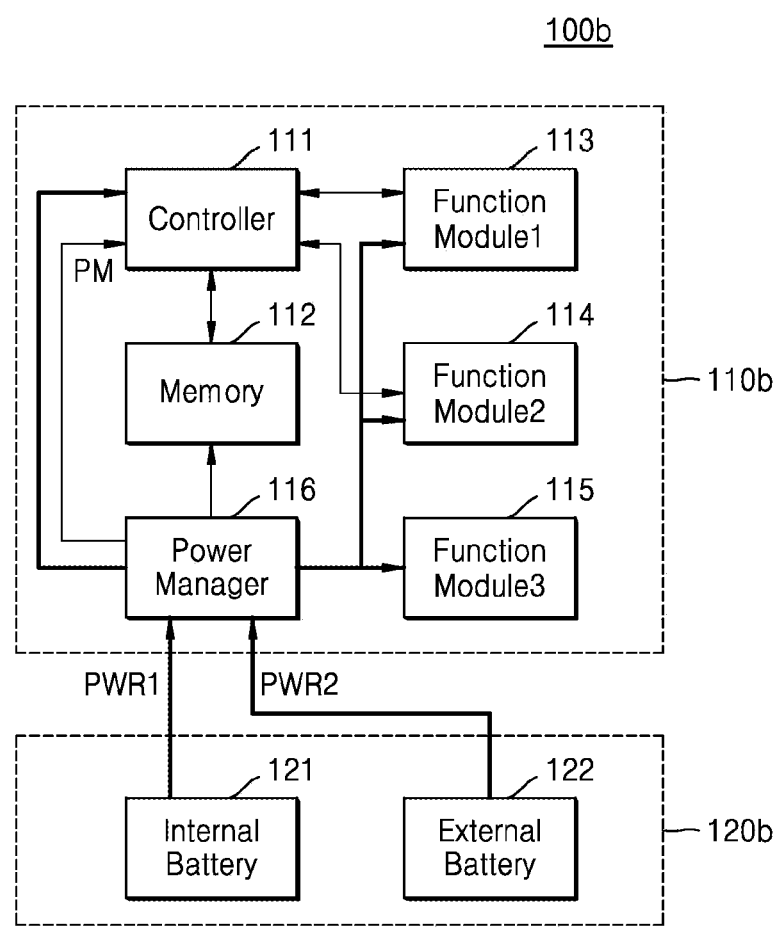
FIG. 7 is a block diagram of an electronic device according to another example embodiment.

FIG. 7 is a block diagram of an electronic device 100b according to an example embodiment.

Referring to FIG. 7, the electronic device 100b, according to an example embodiment, may include a system 110b and a power supplier 120b. The system 110b may include the controller 111, the memory 112, a plurality of first through third function modules 113 through 115, and a power manager 116. FIG. 7 shows that the system 110b includes the plurality of function modules 113 through 115, in addition to the controller 111, the memory 112, and the power manager 116. However, the system 110b is not limited thereto, and a number and a type of function modules may vary according to a function of the electronic device 100b. Additionally, in FIG. 7, the power manager 116 is shown as an additional function module. However, the power manager 116 is not limited thereto, and may be implemented as part of the controller 111.

The power supplier 120b may include the internal battery 121 and the external battery 122. In the example embodiment, the power supplier 120b is shown as including an internal battery 121 and an external battery 122, but is not limited thereto. The power supplier 120b may include two or more internal batteries 121 and/or two or more external batteries 122.

In the example embodiment of FIG. 7, the power manager 116 may manage power of the system 110b. The power manager 116 may control power provided to the controller 111, the memory 112, and the plurality of first through third function modules 113 through 115. The power manager 116 may supply first power PWR1, output from the internal battery 121, and second power PWR2, output from the external battery 122, to the controller 111, the memory 112, and the first through third function modules 113 through 115 based on a state of the power supplier 120b. That is, for example, the state of the power supplier 120b may be determined as to whether the external battery 122 is attached to and/or detached from the electronic device 100b, and/or the amount of charge remaining in the internal battery 121 and the external battery 122, or the like.

Additionally, the power manager 116 may monitor states of the internal battery 121 and the external battery 122, and provide a state signal PM to the controller 111. The state signal PM indicating to the controller 111 the state of the internal battery 121 and the external battery 122. The controller 111 may determine an operation mode, a frequency mode, or the like, of the system 110b based on the stage signal PM. The controller 111 may also control the memory 112, the first through third function modules 113 through 115, and the power manager 116.

Hereinafter, referring to FIG. 8, an example embodiment of a method of controlling power in the electronic device 100b is described.

Figure 8:
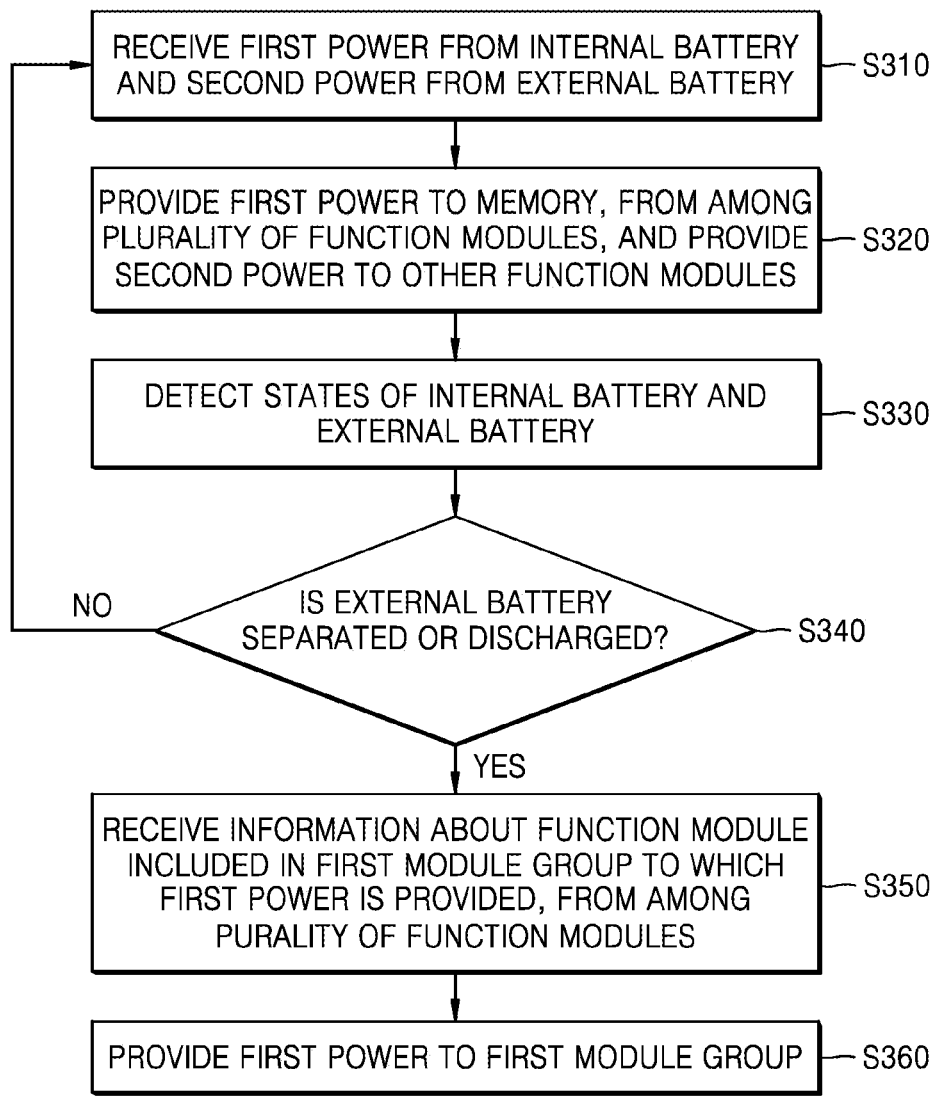
FIG. 8 is a flowchart of an example embodiment of a power control method of an electronic system included in the electronic device shown in FIG. 7.

FIG. 8 is a flowchart illustrating an example embodiment of a power control method for the electronic system 110b included in the electronic system 110b shown in FIG. 7. In detail, FIG. 8 shows an example operation of the power manager 116.

Referring to FIG. 8, at S310 the power manager 116 may receive first power PWR1 from the internal battery 121, and receive second power PWR2 from the external battery 122. Then, at S320, the power manager 116 may provide the first power PWR1 to the memory 112, and provide the second power PWR2 to other function modules, for example, the controller 111 and the first through third function modules 113 through 115.

At S330, the power manager 116 may detect states of the internal battery 121 and the internal battery 122. Accordingly, at S340, the power manager 116 may detect whether the external battery 122 is separated from the electronic device 100b or the external battery 122 is discharged.

If the external battery 122 is not separated from the electronic device 100b or the external battery 122 is not discharged, the power manager 116 may return to S310 and continue as discussed above.

However, if the power manager 116 determines at S340 that the external battery 122 is separated from the electronic device 100b or discharged, then the power manager 116 at S350 may receive information about function modules, from among a plurality of function modules, included in a first module group in the system 110, which received the first power PWR1 from the internal battery 121. For example, the power manager 116 may provide a state signal to the controller 111 indicating a state of whether the external battery 122 is separated from the electronic device 100b or discharged. If the controller 111 determines that the external battery 122 is separated from the electronic device 100b or discharged, then the controller 111 may provide information about the first module group to the power manager 116 at S360. According to an example embodiment, given predetermined (or alternatively, desired) function modules, for example, the real-time modules described above with reference to FIGS. 6A and 6B may be included in the first module group. According to another example embodiment, function modules that operate when the external battery 122 is separated from the electronic device 100b, or discharged, may be included in the first module group.

In more detail, at S360, the power manager 116 may provide the first power PWR1, which is outputted from the internal battery 121, to the function modules included in the first module group. The function modules included in the first module group may include the memory 112 and at least one function module.

Even if the external battery 122 is unexpectedly separated from the electronic device 100b or discharged, one or more given predetermined (or alternatively, desired) function modules including the memory 112 may operate by using the internal battery 121 according to a power control operation by the power manager 116, as described above. Thus, the data loss in the electronic device 100b may be suppressed and/or prevented, and the electronic device 100b may perform an operation and/or continue to perform operations that have been performed.

Figure 9A:
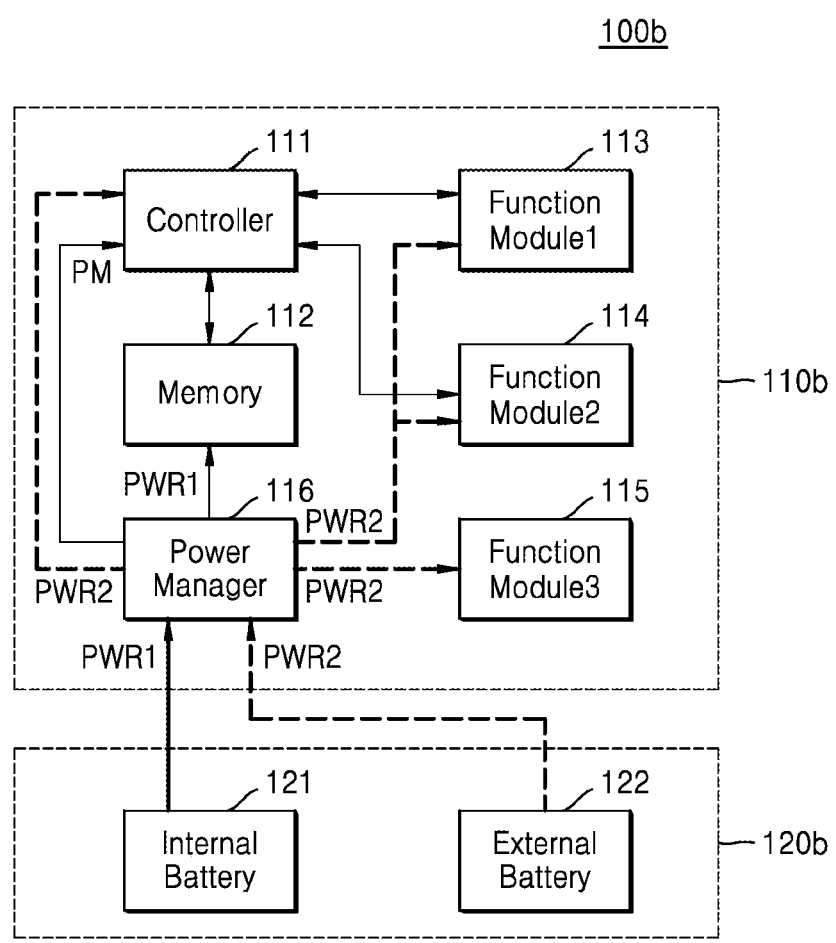
FIGS. 9A and 9B are block diagrams for showing example operation of the electronic device shown in FIG. 7.
Figure 9B:
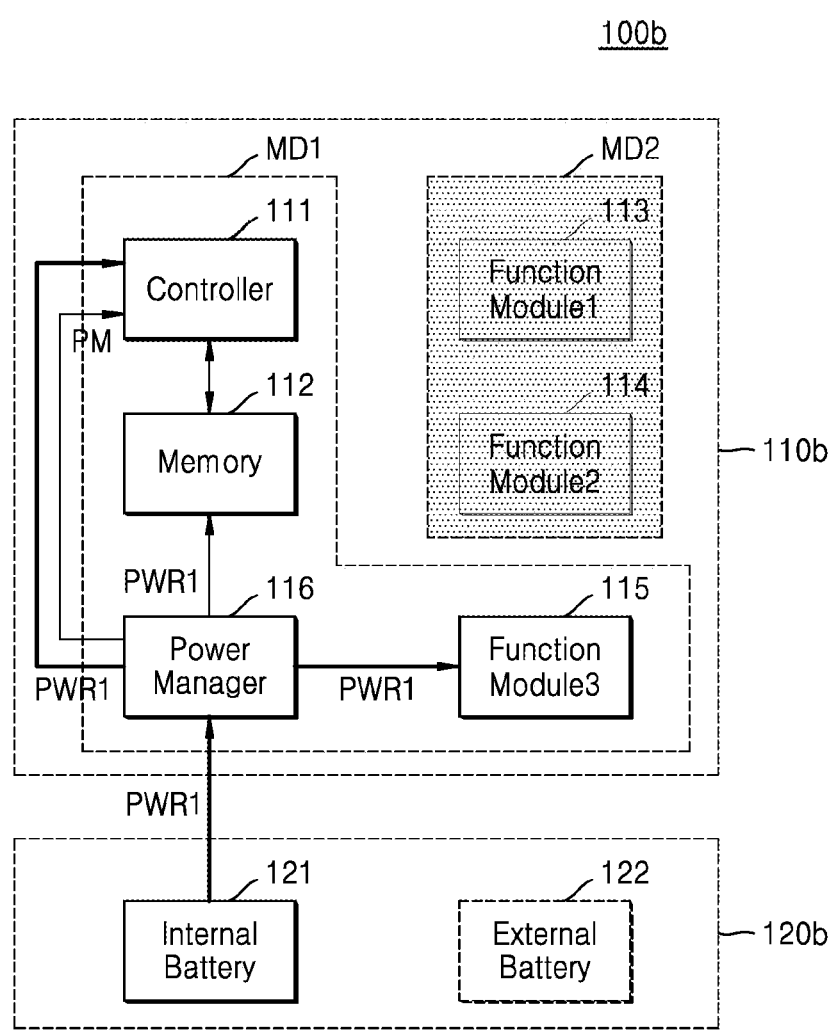

FIGS. 9A and 9B are block diagrams showing an example operation of the electronic device 100b shown in FIG. 7.

FIG. 9A shows a state of power supply to the system 110b and operation of the system 110b when the external battery 122 is attached to the electronic device 100b. That is, for example, the system 110b is in a normal operation state.

FIG. 9B shows a state of power supply to the system 110b and operation of the system 110b after the external battery 122 is detached from the electronic device 100b.

Referring to FIG. 9A, first power PWR1 output from the internal battery 121 and second power PWR2 output from the external battery 122 may be provided to the power manager 116. The power manager 116 may supply the first power PWR1 to the memory 112, and supply the second power PWR2 to other function modules 111 and 113 through 115. Accordingly, the memory 112 operates based on the first power PWR1 supplied from the internal battery 121, and the other function modules 111 and 113 through 115 may operate based on the second power PWR2 supplied from the external battery PWR2.

Referring to FIG. 9B, if the external battery 122 is separated from the electronic apparatus 100b (or if the external battery 122 is completely discharged), the power manager 116 may supply the first power PWR1, which is output from the internal battery 121, to the memory 112, the controller 111 and a third function module 115. According to an example embodiment, the third function module 115 may be a function module for performing an operation of the electronic device 100b. Alternately, the third function module 115 may be a function module that performs an operation before the external battery 122 is separated from the electronic device 100b.

As such in the electronic device 100b, the memory 112 receives power from the internal battery 121, and thus, operates relatively stable. If the external battery 122 is separated from the electronic device 100b or discharged, function modules needed for an operation of the electronic device 100b, and/or alternatively function modules that performed an operation before the external battery 122 is separated or discharged from the electronic device 100b, other than the memory 112, may receive power from the internal battery 121, and operate. Accordingly, the electronic device 100b may suppress and/or minimize the use of the internal battery 121 when the electronic device 100b operates normally, and in a case of an emergency such that the external battery 122 is separated from the electronic device 100b, the electronic device 100b may operate normally by using the internal battery 121.

Figure 10:
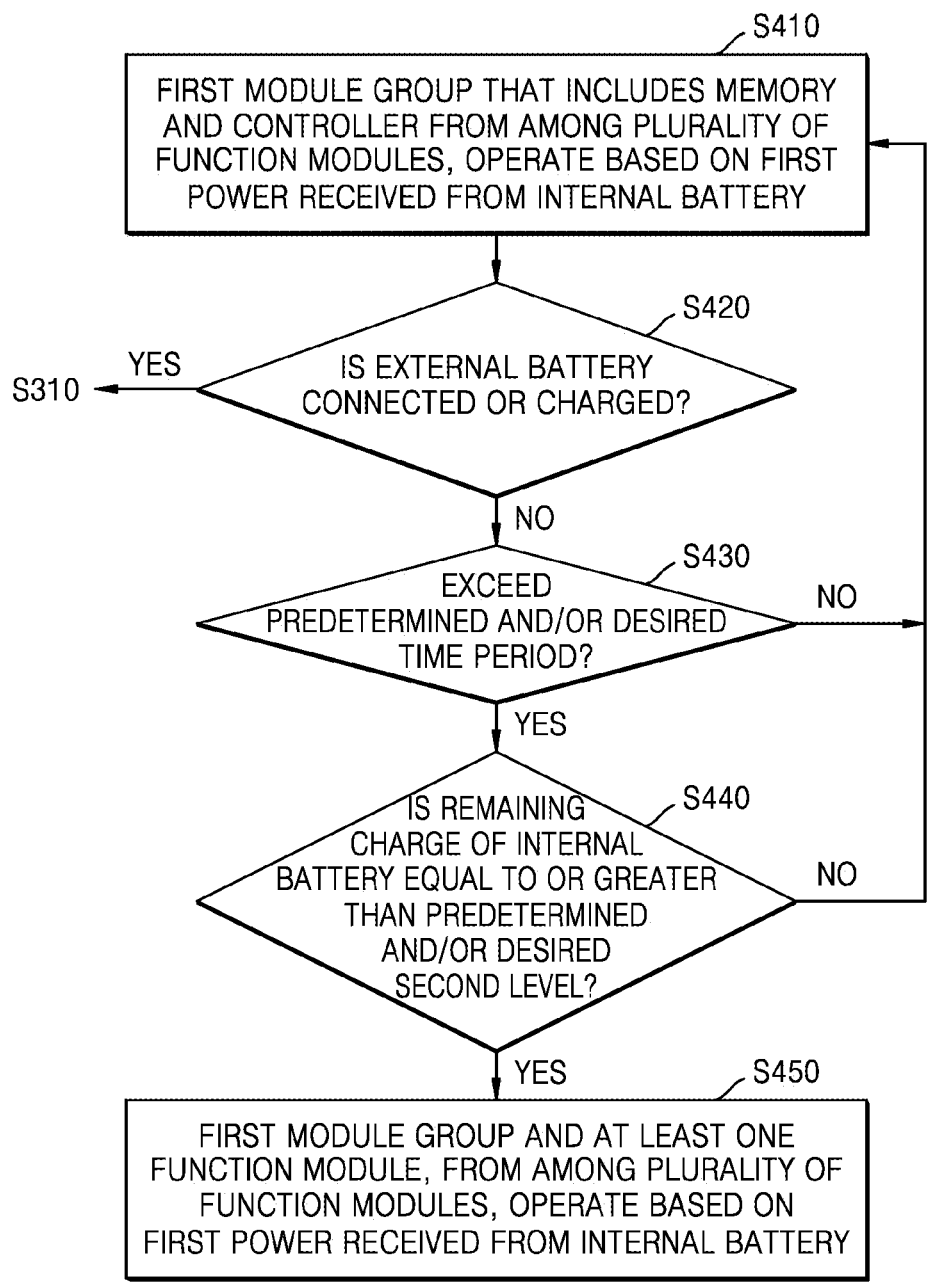
FIG. 10 is a flowchart of a method of operating the electronic system, according to an example embodiment.

FIG. 10 is a flowchart of a method of operating an electronic system, according to an example embodiment. FIG. 10 shows a method of operating the system 110b included in the electronic device 100b shown in FIG. 7, for example, and shows an example embodiment of a method of operating the system 110b in the electronic device 100b when the external battery 122 is separated from the electronic device 100b or discharged.

Referring to FIG. 10, at S410, if the external battery 122 is separated from the electronic device 100b or discharged, a first module group that includes the memory 112 and the controller 111, from among a plurality of function modules included in the system 110b, may operate based on the first power PWR1 received from the internal battery 121. While the first module group operates based on the first power PWR1, at S420 if it is determined that the external battery 122 is reconnected and/or charged to the electronic device 100b, the system 110b may then operate by using the power received back from the external battery 122. Accordingly, as described with reference to S310 and S320 described with reference to FIG. 8, the first power PWR1 may be provided to the memory 112, and the second power PWR2 may be provided to other function modules.

However, at S420 if it is determined that the external battery 122 is not re-connected to the electronic device 100b within a given predetermined (or alternatively, desired) reference waiting time period and/or is not charged, the controller 111 may then measure elapsed time after the system 110b operated by using the internal battery 121, and thus, determine at S430 whether the measured elapsed time exceeds the given predetermined (or alternatively, desired) reference waiting time period.

If the measured elapsed time exceeds the given predetermined (or alternatively, desired) reference waiting time period, the controller 111 and/or the power manager 116 at S440 determines whether a remaining charge of the internal battery 121 is equal to or greater than a given predetermined (or alternatively, desired) second threshold level. If the remaining charge of the internal battery 121 is equal to or greater than the second threshold level, then at S450 the first module group and at least one additional module may operate based on the first power PWR1 received from the internal battery 121. The power manager 116 may provide the first power PWR1 to the at least one additional function module. According to an example embodiment, the first power PWR1 may be provided to a plurality of function modules included in the system 110b and the system 110b may operate normally.

If the measured elapsed time does not exceed the given predetermined (or alternatively, desired) reference waiting time period, and/or if a remaining charge of the internal battery 121 is determined as being insufficient, then the first module group may operate based on the first power PWR1 received from the internal battery 121 as noted above with respect to S410.

When the external battery 122 is separated and/or discharged from the electronic device 100b so that only a part of function modules included in the system 110b operate, the operation of the electronic device 100b may be limited. If the external battery 122 is not reconnected to the electronic device 100b and/or charged within the reference waiting time period, the operation of the electronic device 100b may be limited, which may cause inconvenience to a user.

Accordingly, in the example embodiment, even though the external battery 122 is not reconnected to the electronic device 100b and/or charged within the reference waiting time period, if the remaining charge of the internal battery 121 is determined as being sufficient, the system 110b may increase a number of function modules that use the internal battery 121 so that functions that may be performed by the electronic device 120b may be increased and/or the electronic device 100b may normally perform all or substantially all the functions.

Figure 11:
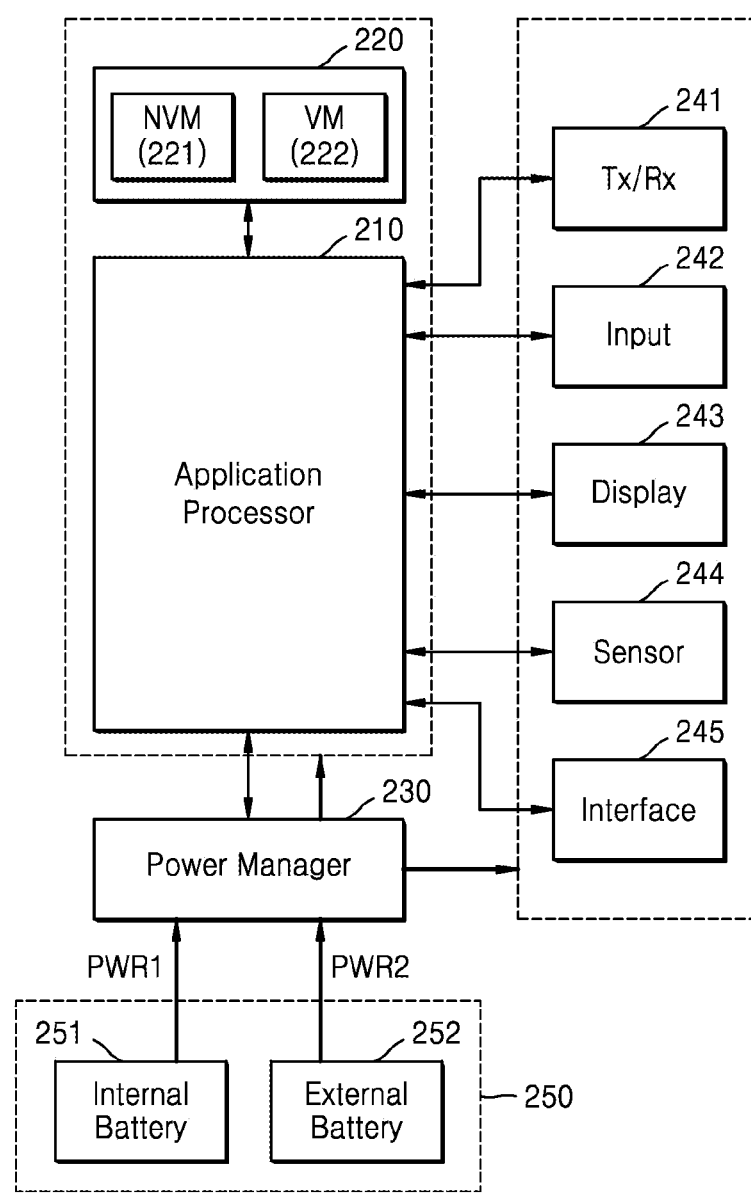
FIG. 11 is a block diagram showing an example embodiment of a mobile electronic device according to an example embodiment.

FIG. 11 is a block diagram showing an example embodiment of a mobile electronic device 200 according to an example embodiment.

The mobile electronic device 200 shown in FIG. 11 is an example embodiment of the electronic device 100 shown in FIG. 1. The method of operating an electronic device, which is described with reference to FIG. 11, may be applied to the example embodiment.

Referring to FIG. 11, the mobile electronic device 200 may include one or more application processors 210 (hereinafter, referred to an AP), a memory 220, a power manager 230, a plurality of function modules 241 through 245. The mobile electronic device 200 may also include a power supplier 250, and the power supplier 250 may include an internal battery 251 and an external battery 252.

The AP 210 may control all the operations of the mobile electronic device 200. The AP 210 may drive an operating system and/or an application program, and perform various processing and operations on various data such as multimedia data. The AP 210 may execute applications providing an internet browser, a game, moving pictures, or the like. According to example embodiments, the AP 210 may include a single core or multiple cores. For example, the AP 210 may include multiple cores such as dual cores, quad cores, hexa cores, or the like. According to example embodiments, the AP 210 may further include a cache memory located inside or outside the AP 210. According to an example embodiment, the AP 210 may further include a graphic processing unit (GPU).

The memory 220 may include a non-volatile memory 221 and a volatile memory 222. The non-volatile memory 221 may include at least one selected from various memories, for example, ROM, PROM, EPROM, EEPROM, flash memory, PRAM, MRAM, RRAM, FRAM, and the like. The non-volatile memory 221 may also include at least one selected from the non-volatile memory devices such as an SSD, an eMMC, a UFS, compact flash (CF), secure digital (SD), Micro-SD, Mini-SD, extreme digital (xD), a memory stick, and the like. The volatile memory 222 may include at least one selected from various memories such as DRAM, SRAM, SDRAM, PRAM, MRAM, RRAM, FeRAM, and the like.

According to an example embodiment, the AP 210 may load a command or data, received from at least one selected from the group consisting of the non-volatile memory 221 and other elements, onto the volatile memory 222, and process the command or the data. Additionally, the AP 210 may store data, received from or generated by at least one selected from the elements, in the non-volatile memory 221.

Still referring to FIG. 11, the mobile electronic device 200 may include various function modules. According to an example embodiment, the mobile electronic device 200 may include a communication module 241, an input module 242, a display module 243, a sensor module 244, and an interface 245.

The communication module 241 may transceive data by communicating with other electronic devices connected to the mobile electronic device 200 via a network. According to an example embodiment, the communication module 241 may include a cellular module, a Wi-Fi module, a Bluetooth module, a GPS module, an NFC module, a radio frequency (RF) module, or the like. The cellular module may provide a voice phone call service, a video phone call service, a text message service, an internet service, or the like via a communication network. Additionally, the cellular module may classify and certify an electronic device in a communication network, by using a subscriber identification module, for example, a subscriber identify module (SIM) card, or the like. A short-range communication module such as a Wi-Fi module, a Bluetooth module, a GPS module, an NFC module, an RF module, or the like may process data transceived via a module corresponding to the data. At least one of the modules included in the communication module 241 may be included in an integrated chip or an integrated chip package.

The input module 242 shown in FIG. 11 may include an input device such as a touch panel, a keypad, an input button, or the like.

The display module 243 shown in FIG. 11 may include a display panel and a display driver. The display panel may be, for example, a liquid-crystal display (LCD), an active-matrix organic light-emitting diode (AM-OLED), or the like. The display panel may be, for example, flexibly, transparently, or wearably implemented. The display panel may be implemented as a module with a touch panel. The display driver may receive an image from the AP 210, and display the received image on the display panel.

The sensor module 244 shown in FIG. 11 may measure physical quantity or detect an operation state of the mobile electronic device 200, and thus, convert information obtained by the measuring or the detecting into an electrical signal. The sensor module 244 may include, for example, a gesture sensor, a gyro sensor, a barometric sensor, a magnetic sensor, an acceleration sensor, a grip sensor, a proximity sensor, a color sensor, a bio sensor, a temperature/humidity sensor, an illuminance sensor, a ultraviolet (UV) sensor, an e-nose sensor, an electromyography (EMG) sensor, an electroencephalogram (EEG) sensor, an electrocardiogram (ECG) sensor, an infrared (IR) sensor, an iris sensor, or a fingerprint sensor, or the like. The sensor module 244 may further include a control circuit for controlling at least one sensor included in the sensor module 244.

The interface 245 shown in FIG. 11 may include, for example, a high-definition multimedia interface (HDMI), a universal serial bus (USB), an optical interface, a D-subminiature (D-sub) interface, a mobile high-definition link (MHL) interface, a SD card/multi-media card (MMC) interface, or an infrared data association (IrDA) standard interface, or the like.

Although not shown, the electronic device 100 may further include various function modules such as a camera module, an audio module, an indicator, a motor, or the like.

The power manager 230 shown in FIG. 11 may manage power of the mobile electronic device 200. The power manager 230 may control power supplied to the AP 210, the memory 220, and the plurality of function modules 241 through 245.

The power supplier 250 shown in FIG. 11 may include at least one internal battery 251 and an external battery 252. The internal battery 251 and the external battery 252 may be charged and/or discharged. According to an example embodiment, the external battery 252 may charge the internal battery 251.

If the mobile electronic device 200 shown in FIG. 11 operates normally, that is, for example, if the external battery 252 is connected to the mobile electronic device 200, the power manager 230 may supply first power PWR1, output from the internal battery 251, to one or more function modules including the memory 220 (hereinafter referred to as a first module group), and supply second power PWR2, output from the external battery 252, to other function modules (referred to as a second module group).

The first module group, for example, may include the AP 210 and the memory 220, and further include at least one module selected from the group including communication module 241, the input module 242, and the display module 243. The second module group may include the sensor module 244, and the interface 245. However, the first module group and the second group are not limited thereto. Function modules included in the first module group and the second module group may be determined according to a type and main function of the mobile electronic device 200, respectively.

As such, even if the external battery 252 is unexpectedly separated and/or discharged from the mobile electronic device 200, the power manager 230 may continue to supply the first power PWR1 to the first module group. According to an example embodiment, the power manager 230 may supply the first power PWR1 to the first module group and to the one or more function modules included in the second module group.

In the example embodiment, the mobile electronic device 200 may include the internal battery 251 and the external battery 252 as shown in FIG. 11. The internal battery 251 supplies power to the memory 220. Thus, a sudden power-off of the memory 220 may be suppressed and/or prevented, and as such the data loss in the memory 112 may be suppressed and/or prevented. Additionally, if the external battery 252 is separated from the mobile electronic device 200 or discharged, the internal battery 251 supplies power to the memory 220 and a function module that performs a main function of the mobile electronic device 200. Thus, even if the external battery 252 is unexpectedly separated from the mobile electronic device 200 or discharged, the mobile electronic device 200 performs a given predetermined (or alternatively, desired) operation and/or continues to perform an operation that has been performed before the external battery 252 is separated from the mobile electronic device 200 or discharged, which may enhance user convenience.

According to one or more example embodiments, an electronic device and an electronic system may perform as IoT devices. Hereinafter, according to example embodiments in which an electronic device and an electronic system operate as IoT devices are described.

The IoT devices may include devices equipped with a wired or wireless interface that may be connected to other devices and transceive data by communicating with one or more other devices via the wired or wireless interface. The wired or wireless interface that may be connected to other devices may include a local area network (LAN), a wireless LAN (WLAN) such as Wi-Fi, a wireless personal area network (WLAN) such as Bluetooth, a wireless universal serial bus (USB), Zigbee, NFC, radio-frequency identification (RFID), power Line communication (PLC) or a mobile cellular network such as 3rd generation (3G), 4th generation (4G), LTE, or the like. The Bluetooth interface may support Bluetooth low energy (BLE).

Figure 12:
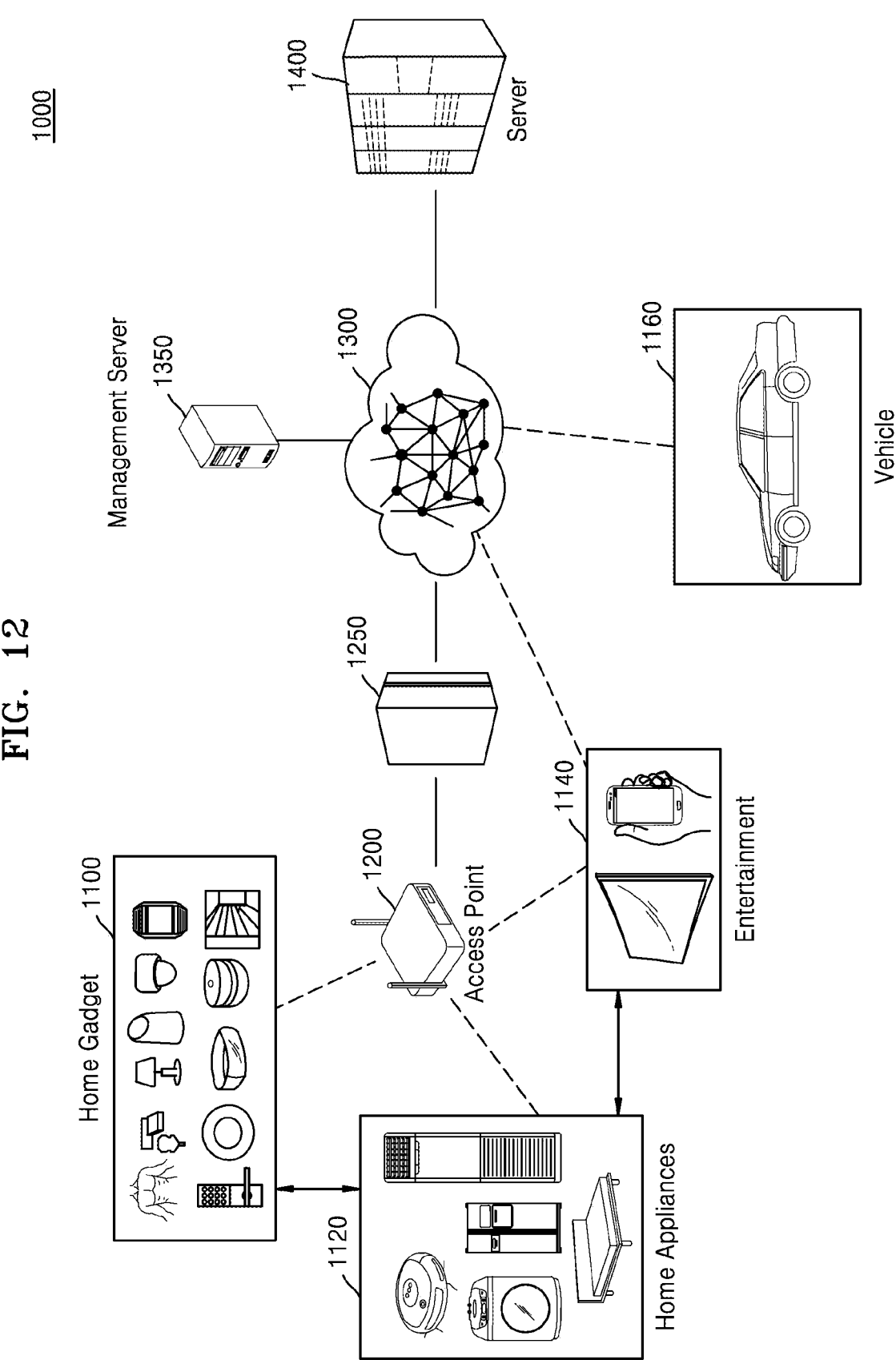
FIG. 12 illustrates a diagram showing an internet of things (IoT) network system according to example embodiments.

FIG. 12 illustrates a diagram showing an IoT network system 1000 according to example embodiments. Referring to FIG. 12, the IoT network system 1000 may include a plurality of IoT devices such as including but not limited to a plurality of home gadgets 1100, a plurality of home appliances 1120, a plurality of entertainment devices 1140, and/or an automobile vehicle 1160.

An IoT may refer to a network between things that use wired/wireless communication. Accordingly, according to example embodiments, the IoT may be also referred to as various terms such as an IoT network system, a ubiquitous sensor network (USN) communication system, a machine type communications (MTC) system, a machine oriented communication (MOC) system, a machine-to-machine (M2M) communication system, or a device-to-device (D2D) communication system, or the like. The IoT network system, which is to be described herein, may include an IoT device, an access point, gateway, a communication network, a server, or the like. However, such elements are classified so as to describe the IoT network system, but are not limited to the scope of the IoT network system. Additionally, the IoT network system may employ a transmission protocol such as a user datagram protocol (UDP), a transmission control protocol (TCP), or the like, an application protocol such as an IPv6 Low-power Wireless Personal Area Networks (6LoWPAN) protocol, an IPv6 internet routing protocol, constrained application protocol (CoAP), a hypertext transfer protocol (HTTP), message queue telemetry transport (MQTT), MQTT for sensors networks (MQTT-S), or the like.

In the wireless sensor network (WSN), each of the plurality of IoT devices such as including but not limited to a plurality of home gadgets 1100, a plurality of home appliances 1120, a plurality of entertainment devices 1140, and/or an automobile vehicle 1160 may be used as a sync node or a sensor node. The sync node is also referred to as a base station, and may function as a gateway for connecting the WSN to an external network (for example, the Internet), provide a task to each sensor node, and gather an event detected by each sensor node. A sensor node is a node that is included in the WSN and may process and gather sensory information. The sensor node may be a node that may perform communication between nodes connected to each other in the WSN.

The plurality of the IoT devices such as including but not limited to a plurality of home gadgets 1100, a plurality of home appliances 1120, a plurality of entertainment devices 1140, and/or an automobile vehicle may include an active IoT device that operates by using its own power and a passive IoT device that operates by using power wirelessly supplied from outside. The active IoT device may include a refrigerator, an air conditioner, a telephone, a vehicle, or the like. The passive IoT device may include an RFID tag or an NFC tag.

The plurality of devices such as including but not limited to a plurality of home gadgets 1100, a plurality of home appliances 1120, a plurality of entertainment devices 1140, and/or an automobile vehicle may include a passive communication interface such as a quick response (QR) code, an RFID tag, an NFC tag, or the like, or include an active communication interface such as a modem, a transceiver, or the like.

The plurality of the IoT devices such as including but not limited to a plurality of home gadgets 1100, a plurality of home appliances 1120, a plurality of entertainment devices 1140, and/or an automobile vehicle may gather data by using a sensor, or transmit the gathered data to outside via a wired/wireless communication interface. Additionally, the plurality of IoT devices such as including but not limited to a plurality of home gadgets 1100, a plurality of home appliances 1120, a plurality of entertainment devices 1140, and/or an automobile vehicle may transmit and/or receive control information and/or data via the wired/wireless communication interface. The wired or wireless communication interface may be one of the interfaces that may be accessed.

At least one selected from the plurality of the IoT devices such as including but not limited to a plurality of home gadgets 1100, a plurality of home appliances 1120, a plurality of entertainment devices 1140, and/or an automobile vehicle may include the electronic device or the electronic system that was described with reference to FIGS. 1 through 11 according to example embodiments. According to example embodiments, an IoT device to which the electronic device or the electronic system is applied may include at least one memory. The memory may receive power from an internal battery embedded in the IoT device. Other function modules included in the IoT device, for example, a sensor, an input/output unit, a display, a communication module, or the like, may receive power from an internal battery or an external battery. Even if the external battery is suddenly separated from the electronic device or the electronic system or the external battery is discharged, function modules including at least one memory and configured to perform an operation of the IoT device may receive power from the internal battery. Accordingly, a sudden power-off of the IoT device may be suppressed and/or prevented, and the data loss may be suppressed and/or prevented.

The plurality of the IoT devices such as including but not limited to a plurality of home gadgets 1100, a plurality of home appliances 1120, a plurality of entertainment devices 1140, and/or an automobile vehicle may form groups according to characteristics of each IoT device. The plurality of the IoT devices 1100, 1200, 1140, and 1160 may form a temperature control group for controlling an indoor temperature, a large home appliance group and a small home appliance group according to a degree to which power is consumed, a cleanliness group for controlling indoor cleanliness (for example, air cleaning or floor cleaning), a lighting group for controlling indoor lighting, an entertainment group 1140 for controlling an entertainment-type device (for example, a TV, an audio device, or the like), or the like. The temperature control group may include an air conditioner, an electric window, an electric curtain, or the like. For example, the home gadget group 1100 shown in FIG. 12 may include a heart-rate sensor patch, a medical device for measuring blood glucose, a lighting apparatus, a hygrometer, a monitoring camera, a smartwatch, a security keypad, a thermostat, a fragrance device, a window blind, or the like. The home appliance/furniture group 1120 may include a home appliance such as a robot cleaner, a washing machine, a refrigerator, an air conditioner, a TV, or furniture such as a bed that includes a sensor. The entertainment group 1140 may include a multimedia image device and/or a communication device such as a TV, a smartphone, or the like.

Each of the IoT devices may belong to a plurality of groups. For example, an air conditioner may belong to a large home appliance/furniture group 1120 and the temperature control group. A TV may belong to the home appliance/furniture group 1120 and the entertainment group 1140. Additionally, a smartphone may belong to the home gadget group 1100 and the entertainment group 1140.

The IoT network system 1000 shown in FIG. 12 may further include an access point 1200. The plurality of IoT devices 1100, 1120, and 1140 may be connected to a communication network or another IoT device via the access point 1200. The access point 1200 may be equipped in an IoT device. For example, the access point 1200 may be equipped in a TV. In this case, a user may monitor or control at least one IoT device connected to the access point 1200 via a display included in the TV. Additionally, the access point 1200 may be included in one of the IoT devices. For example, a cellular phone may be an IoT device and, at a same time, the access point 1200 connected to another IoT device. The cellular phone may be connected to a communication network via a mobile cellular network or a short-range wireless network.

The IoT network system 100 may further include a gateway 1250. The gateway 1250 may change a protocol so as to connect the access point 1200 to an external communication network (for example, the Internet or a public communication network). The IoT devices 1100, 1120, and 1140 may be connected to the external communication network via the gateway 1250. According to example embodiments, the gateway 1250 may be configured to be integrated into the access point 1200. In another example embodiment, the access point 1200 may perform a function of a first gateway, and the gateway 1250 may function as a second gateway.

The gateway 1250 may be included in one of the IoT devices. For example, a cellular phone may be an IoT device and, at a same time, the gateway 1250 may be connected to another IoT device. In this case, the cellular phone may be connected to a mobile cellular network.

The IoT network system 1000 may further include at least one communication network 1300. The communication network 1300 includes the Internet or a public communication network. The public communication network may include a mobile cellular network. The communication network 1300 may be a channel via which information, gathered by the IoT devices such as including but not limited to a plurality of home gadgets 1100, a plurality of home appliances 1120, a plurality of entertainment devices 1140, and/or an automobile vehicle, is transmitted.

The IoT network system 1000 shown in FIG. 12 may further include a server 1400 connected to the communication network 1300. The communication network 1300 may transmit data, sensed by the IoT devices 1100, 1120, 1140, and 1160, to the server 1400. The server 1400 may store or analyze the transmitted data. Additionally, the server 1400 may transmit a result of the analyzing via the communication network 1300. The server 1400 may store information, related to at least one selected from the IoT devices 1100, 1120, 1140, and 1160, and analyze data transmitted from an IoT device related to the data, based on the stored information. Additionally, the server 1400 may transmit the result of the analyzing to the IoT device related to the data or a user device via a communication network. For example, in a case of an IoT device for measuring blood glucose of a user in real time, the server 1400 may store a threshold value of blood glucose, given predetermined (or alternatively, desired) by a user, in advance and receive a value of measured blood glucose via a communication network. Then, the server 1400 may compare the threshold value of blood glucose to the received value of the measured blood glucose; and transmit information, indicating whether the received value of the measured blood glucose is at a dangerous level, to the user device and/or the IoT device for measuring blood glucose of the user.

Figure 13:
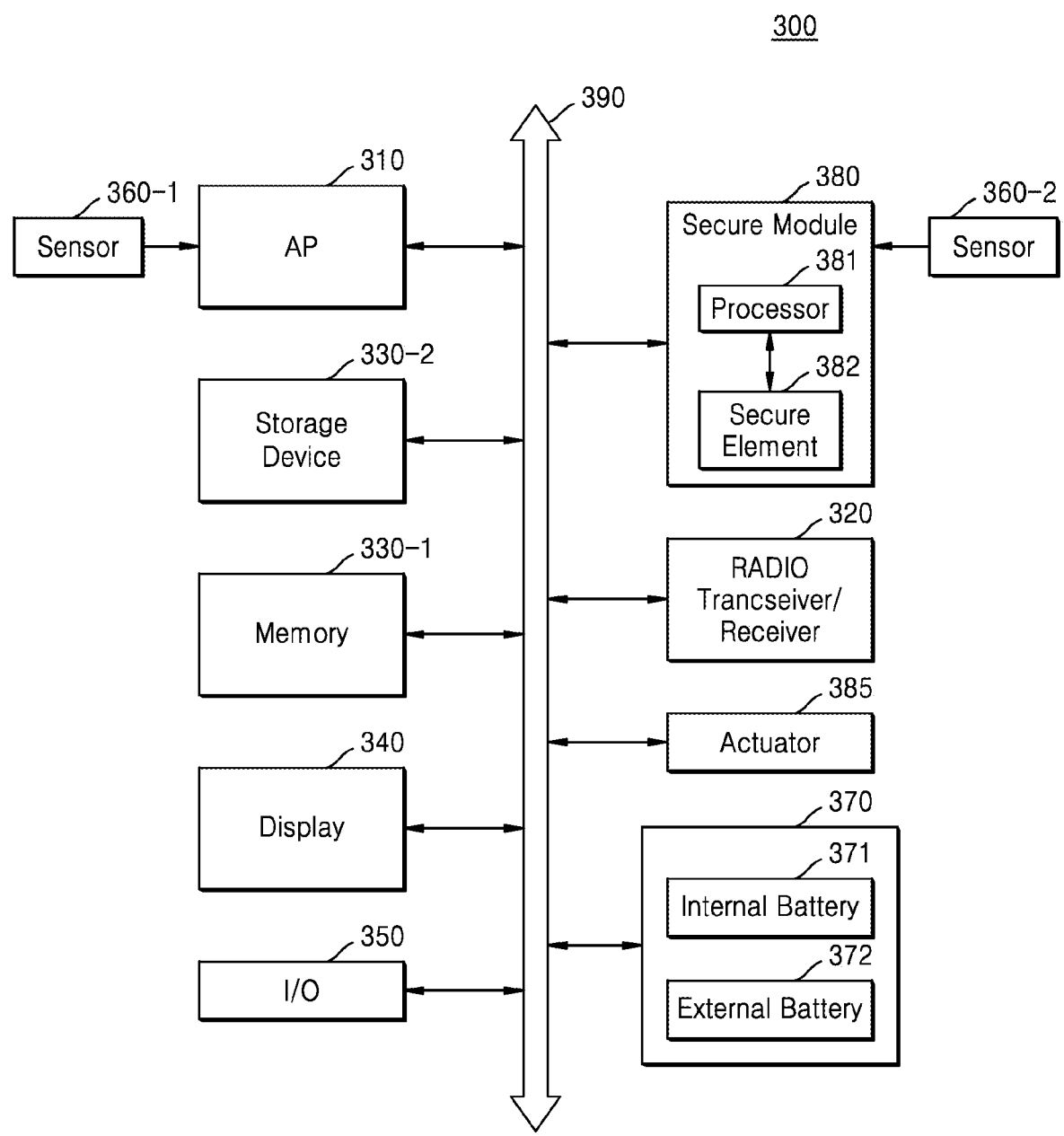
FIG. 13 illustrates a structural hardware (HW) map of an IoT device according to an example embodiment.

FIG. 13 illustrates a structural hardware map of an IoT device 300 according to an example embodiment. The mobile electronic device 200, described with reference to FIG. 11, may be applied as the IoT device 300 shown in FIG. 13. One or more elements of the mobile electronic device 200, shown in FIG. 11, may be identical to the elements of the IoT device 300. Since the elements identical to each other have a same function, a description thereof is not provided here again.

In the example embodiment, a module or a secure element may refer to hardware (or a hardware component) that may perform a function and/or an operation corresponding to a name thereof, software (or a software component) that may perform a particular function and/or operation, or an electronic recording medium (for example, a processor or a CPU) in which a computer program code that may perform a particular function and/or operation is installed, but is not limited thereto. In other words, a module or a secure element may refer to hardware or a functional and/or structural combination of software for driving the hardware.

Referring to FIG. 13, the IoT device 300 may include an AP 1310, a communication interface 320, a secure module 380, a storage device 330-2, a memory 330-1, a display 340, an input/output device 350, a data bus 390, a power supply device 370, an actuator 385, and/or at least one sensor 360-1 or 360-2.

The AP 310 may control all operations of the IoT device 300.

The secure module 380 shown in FIG. 13 may include a processor 381 and a secure element 382. The secure module 380 that includes a processor 381 and a secure element 382 are formed as a package, and an internal bus INT_BUS connecting the processor 381 to the secure element 382 may be formed in the package. The secure element 382 may defend against an attack from the outside, for example, a lab attack. Accordingly, the secure element 382 may be used to securely store security data. The processor 381 may be connected to the AP 310.

The sensor 360-1 may be, for example, an image sensor for sensing an image. The sensor 360-1 may be connected to the AP 310, and transmit generated image information to the AP 310. The sensor 360-2 may be a biosensor for detecting biometric information. For example, the sensor 360-2 may detect a fingerprint, an iris pattern, a blood vessel pattern, a heart rate, blood glucose, or the like, generate sensing data corresponding to information obtained by the detecting, and thus, provide the sensing data to the processor 381 included in the secure module 380. However, the sensor 360-2 is not limited to a biosensor, and may be an arbitrary sensor such as an illuminance sensor, a sound sensor, an acceleration sensor, or the like.

The secure module 380 includes the secure element 382. The secure module 380 and the AP 310 may generate a session key by performing a cross-certification. For example, the AP 310 and the secure element 382 may perform a cross-certification by using a first certificate stored in the secure element 382, a second certificate stored in the AP 310, and a public key of a certification authority which is stored both in the AP 310 and the secure element 382. As a result of the certification, if the cross-certification is done, the session key may be generated by using a first personal key stored in the secure element 382 and a second personal key stored in the AP 310. Then, the secure module 380 may encrypt sensing data by using the session key, and transmit the encrypted sensing data to the AP 310. Then, the AP 310 may decrypt the encrypted sensing data by using the session key, and thus, obtain the sensing data. Accordingly, a security level of data transmission in the IoT device 300 may enhance. In this case, the secure element 382 and the application 310 may be formed as a package.

The secure module 380 may further include the processor 381. The processor 381 may encrypt sensing data, input by the sensor 360-2, and control communication between the AP 310 and the secure element 382. In an example embodiment, the secure element 382 and the processor 381 may be formed as a package.

The storage device 330-2 may store a boot image for booting the IoT device 300. For example, the storage device 330-2 may include a non-volatile memory device such as a flash memory device, an SSD, or the like.

The memory 330-1 may store data needed to operate the IoT device 300. For example, the memory 330-1 may include a volatile memory device such as DRAM, SRAM, or the like.

The input/output device 350 shown in FIG. 13 may include an input unit such as a touchpad, a keypad, an input button, or the like, and an output unit such as a display, a speaker, or the like. The power supply device 370 may supply an operating voltage needed to operate the IoT device 300.

The power supply device 370 shown in FIG. 13 may include a power supplier and/or a battery. The power supply device 370 may include at least one internal battery 371 and at least one external battery 372. The external battery 372 is a main battery for supplying power to most elements of the power supply device 370, and the internal battery 371 may be an auxiliary battery. The internal battery 371 may supply power to the memory 330-1 and the storage device 330-2. If the external battery 372 is separated from the IoT device 300 or discharged, the internal battery 371 may supply power to one or more elements of the IoT device 300 in addition to the memory 330-1 and the storage device 330-2. For example, the internal battery 371 may supply power to elements such as the AP 310, the secure module 380, or the like, which is needed for an operation and security of the IoT device 300. Accordingly, even if the external battery 372 is separated from the IoT device 300 or discharged, the power is supplied to the memory 330-1, the storage device 330-2, and the secure module 380, respectively, and thus, security data may be securely stored.

The actuator 385 shown in FIG. 13 may include various elements needed to physically drive the IoT device 300. For example, the actuator 385 may include a motor driving circuit and a motor.

According to example embodiments, the IoT device 300 may be an arbitrary mobile system such as including but not limited to a mobile phone, a smartphone, a personal digital assistant (PDA), a portable multimedia player (PMP), a digital camera, a music player, a portable game console, a navigation system, a laptop computer, or the like.

Figure 14:
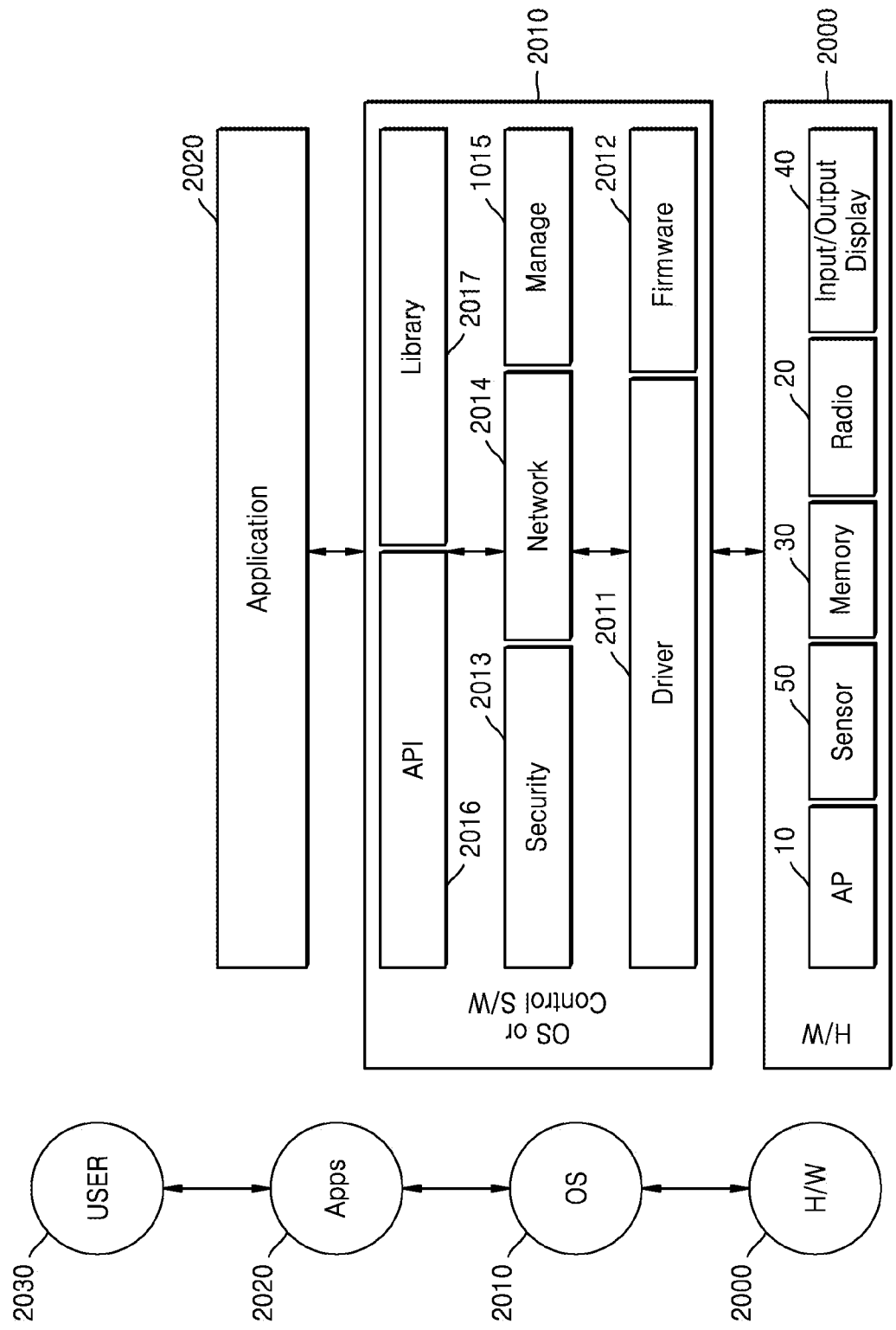
FIG. 14 illustrates a conceptual diagram of a HW structure and a software (SW) structure of the IoT device according to an example embodiment.

FIG. 14 illustrates a conceptual diagram of a hardware (HW) structure and a software (SW) structure of the IoT device 300 according to an example embodiment. Referring to FIG. 14, a hardware 2000 may include one or more elements of the IoT device 300 described with reference to FIG. 13. The hardware 2000 may include an AP 10, a sensor 50, a memory 30, a communication interface 20, and an input/output unit 40. According to an example embodiment, elements including the memory 30 and the AP 10 may receive power from an internal battery that is embedded in the IoT device 300 and is not easily separated from the IoT device 300, and other elements may receive power from an external battery that may be easily attached to or detached from the IoT device 300.

The IoT device 300 may further include an OS 2010 and/or an application 2020. Referring to FIG. 14, an operation performed between each layer ranging from the hardware 2000, the OS 2010, the application 2020, and a user 2030 is shown.

The application 2020 shown in FIG. 14 refers to software and a service for implementing a particular function. The user 2030 refers to an object that uses the application 2020. The user 2030 may communicate with the application 2020 via a user interface (UI). The application 2020 is manufactured based on each service purpose, and thus, communication with the user 2030 via an UI corresponding to each service purpose. The application 2020 performs an operation requested by the user 2030 and, if needed, call an application protocol interface (API) 2016 or a library 2017.

The API 2016 and/or the library 2017 shown in FIG. 14 may perform a macro operation corresponding to a particular function or, if a communication with a lower layer is needed, provide an interface. If the application 2020 requests a lower layer to perform an operation via the API 2016 and/or the library 2017, the API 2016 and/or the library 2017 may classify a received request into fields such as a security 2013, a network 2014, and a management 2015. The API 2016 and/or the library 2017 may operate a layer needed according to a field corresponding to the request. For example, if the API 2016 requests a function related to the network 2014, the API 2016 may transmit a parameter needed for a layer of the network 2014, and call a function related to the network 2014. In this case, the network 2014 may communicate with a lower layer so as to perform a requested operation. If there is not a lower layer, the API 2016 and/or the library 2017 may perform the operation.

The driver 2011 shown in FIG. 14 manages the hardware 2000 and checks a state of the hardware 2000. The driver 2011 also receives a request classified by upper layers and transmits the request to a layer of the hardware 2000.

If the driver 2011 requests the layer of the hardware 2000 to perform an operation, a firmware 2012 may convert the request so that the layer of the hardware 2000 may receive the request for the operation. The firmware 2012 converts and transmits the request to the hardware 2000. The firmware 2012 may be configured to be included in the driver 2011 or the hardware 2000.

The IoT 300 may include the API 2016, the driver 2011, and the firmware 2012, and include the OS 2010 for managing the API 2016, the driver 2011, and the firmware 2012. The OS 2010 may be stored in the memory 30 in the form of a control command code or data. Since a low-priced IoT device having a simple function has a small memory capacity, the IoT device may include control software 2010 instead of the OS 2010.

The hardware 2000 may execute a request (or a command), transmitted from the driver 2011 or the firmware 2010, in order or out of order, and store a result of the executing in a register in the hardware 2000 or the memory 30 connected to the hardware 2000. The stored result may return to the driver 2011 or the firmware 2012.

The hardware 2000 may request a needed operation for an upper layer, by generating an interrupt. If an interrupt is generated, the hardware 2000 checks the interrupt in the management 2015 in the OS 2010, and then, communicates with a core of the hardware 2000, and thus, processes the interrupt. For example, if a letter a' is input to a keyboard that is one of peripherals, the inputting of the letter a' is regarded as an interrupt, and thus, is transmitted to the management 2015 in the OS 2010, or directly to the hardware 2000. Then, the hardware 2000 may output a value of 'R' on a display of the input/output unit 40.

Figure 15:
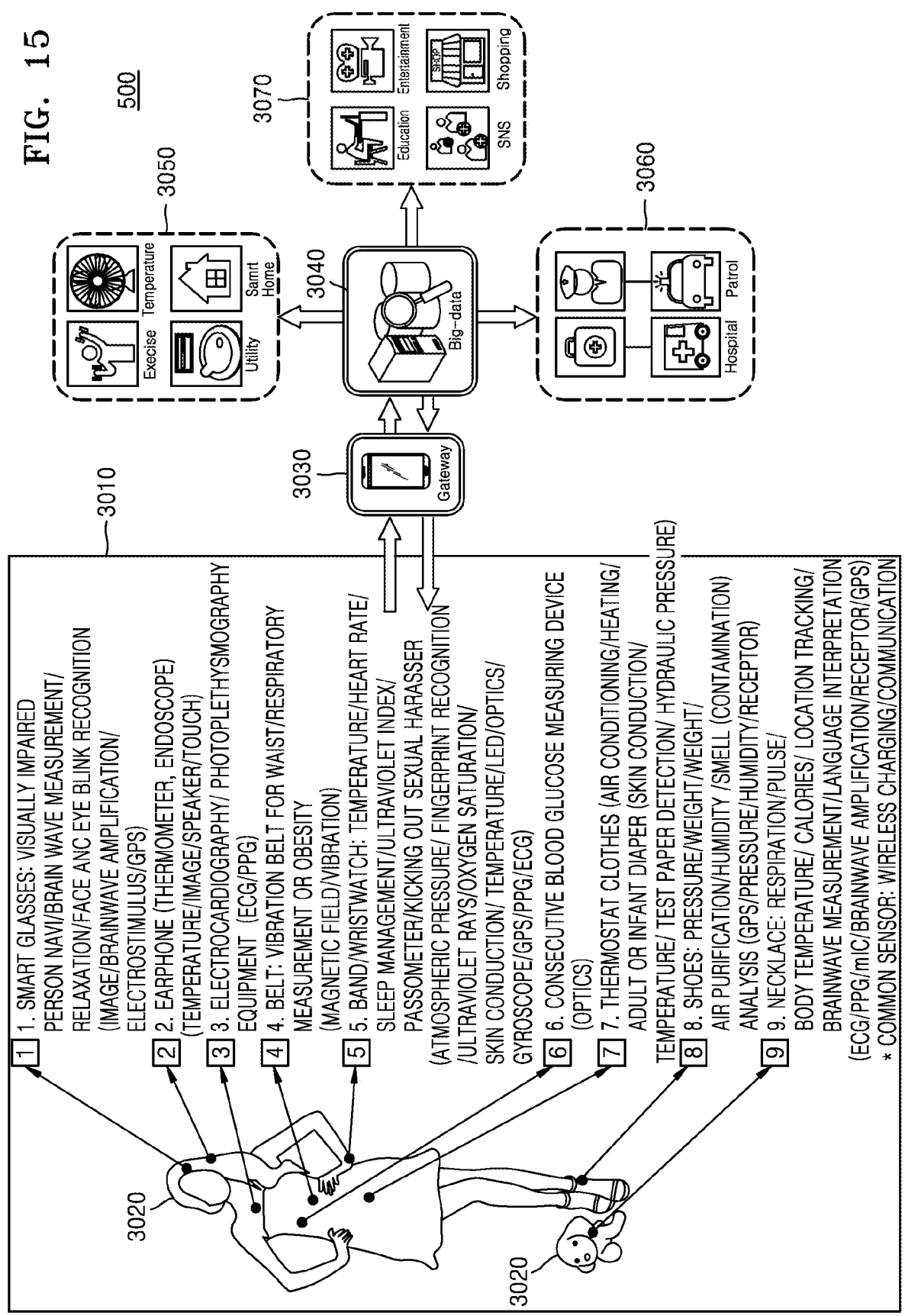
FIG. 15 illustrates a conceptual diagram showing a wearable IoT device and various services that are provided by a service system and employ the wearable IoT device, according to an example embodiment.

FIG. 15 illustrates a conceptual diagram showing wearable IoT devices 3010 and various services that are provided by a service system 3000 and employ the wearable IoT device, according to an example embodiment. An example embodiment, described with reference to FIG. 15, describes a usage scenario regarding health, personal safety, a social network service (SNS), an information providing and smart home service, or the like. Referring to FIG. 15, the service system 3000 may include at least one IoT device 3010, a gateway 3030, a server 3040, and at least one service provider 3050, 3060, or 3070.

The IoT device 3010 may be implemented as a wearable IoT device 3010 such as smart glasses 3010-1, an earphone 3010-2, an electrocardiography/photo-plethysmography (ECG/PPG) equipment 3010-3, a belt 3010-4, a band or a wristwatch 3010-5, a blood glucose measuring device 3010-6, thermostat clothes 3010-7, shoes 3010-8, a necklace 3010-9, or the like. The wearable IoT device 3010 may include a sensor for sensing a state of the user 3020, a surrounding environment, and/or a user command. Additionally, the IoT device 3010 may include a replaceable battery or have a wireless charging function so as to receive power supply, and have a wireless communication function for communicating with outside.

According to the example embodiments described with reference to FIGS. 1 through 11, an electronic device or an electronic system may be applied to at least one selected from the IoT devices 3010. The IoT devices 3010 may include an internal battery and an external battery that may be detachably attached to the IoT, and the internal battery may supply power to a memory included in the IoT device 3010. Accordingly, even if the external battery is separated from the IoT device 3010, data loss in the memory may be suppressed and/or prevented. For example, the IoT device 3010 may suppress and/or prevent loss of sensing data that is generated by sensing a state of the user 3020, a surrounding environment, and/or a user command. Additionally, even if the external battery is separated from the IoT device 3010 or discharged, an operation of the IoT device 3010 may be performed.

The gateway 3030 may transmit information, gathered by the sensor, to the server 3040 via a communication network, or transmit analysis information, transmitted by the server 3040, to an IoT device corresponding to the analysis information. For example, the gateway 3030 may be connected to an IoT device via a short-range wireless communication protocol. The gateway 3030 may be a smartphone, for example, which may be connected to a wireless communication network such as Wi-Fi, 3G, LTE, or the like. The gateway 3030 may be connected to the server 3040 via an Internet network or a wireless communication network.

According to the example embodiments described with reference to FIGS. 1 through 11, an electronic device or an electronic system may be applied to the gateway 3030. The gateway 3030 may include a memory, an internal battery, and an external battery that is detachably attached to the gateway 3030, and the internal battery may supply power to the memory. Accordingly, even if the external battery is separated from the gateway 3030, data loss in the memory may be suppressed and/or prevented. Additionally, since the internal battery supplies power to one or more main function modules of the gateway 3030, the gateway 3030 may perform a given predetermined (or alternatively, desired) operation or continue to perform an operation that has been performed.

The server 3040 may store or analyze gathered information, and thus, generate service information related to the gathered information, or provide stored information and/or analyzed information to the service provider 3050, 3060, or 3070. The service provider 3050, 3060, or 3070 may analyze the gathered information, and thus, provide a service to the user 3020. The providing of the service may include providing information useful to the user 3020, providing an alarm service, providing information about personal protection, providing control information about the wearable IoT device 3010.

A smart home service provider 3050 may certify user information, received from the user 3020, and control the IoT devices at home of the user 3020 with reference to a set value set with reference to the server 140. For example, the smart home service provider 3050 may provide a smart home service for controlling the IoT devices related to air conditioning/heating and installed at home of the user 3020, the IoT devices related to energy resources such as gas, water, electricity, or the like, IoT devices related to an indoor condition such as lighting, humidity, air purification, or the like, and/or the IoT devices related to exercise prescription in consideration of a level of daily activities of the user 3020. Likewise, a leisure activity service provider 3070 may provide a service related to leisure activities of the user 3020. For example, the leisure activity service provider 3070 may receive information about a physical state or a location of the user 3020, and recommend food, shopping information, or restaurants to the user 3020.

The health and safety service provider 3060 may provide an emergency medical/public safety service based on state information about the user 3020. Additionally, the health and safety service provider 3060 may transmit an alarm to the user 3020 based on information about childbearing ages to the user 3020, and transmit precautions to the user 3020 based on information about spread of virus, or recommend information about food or menus, to which the user 3020 may need to pay attention.

The smart glasses 3010-1 are worn on a head of the user 3020, and may sense a surrounding environment of the user 3020, a state of the user 3020, and a command by the user 3020, by using a sensor such as a dry eye syndrome sensor, an eye blink sensor, an image sensor, a brainwave sensor, a touch sensor, a voice recognition sensor, a global positioning sensor (GPS), or the like. Information obtained by the sensing is transmitted to the server 3040, and the server 3040 may provide a service effective to the user 3020. For example, the server 3040 may transmit electrostimulation information, which may be used to treat an abnormal brainwave of the user 3020, to the user 3020 based on received information about a brainwave of the user 3020, and thus, the abnormal brainwave of the user 3020 may be treated via the smart glasses 3010-1 and control a feeling of the user 3020.

The earphone 3010-2 is inserted into ears of the user 3020 or covers ears of the user 3020, and thus, sense physical information about the user 3020 or a command by the user 3020 via a sensor such as a temperature sensor, an image sensor, or a touch sensor. The ECG/PPG equipment 3010-3 may measure a heart rate of the user 3020 by using an ECG/PPG sensor. The belt 3010-4 may include a sensor for measuring a waist size, a respiration rate, or obesity of the user 3020, and may perform a vibration function or an electrostimulation function for treating obesity or pain. The band/wristwatch 3010-5 may include a sensor related to a body temperature, a heart rate, or sleep management of the user 3020, atmospheric pressure, ultraviolet rays, oxygen saturation, optics, a gyroscope, a GPS, PPG, ECG, skin conduction, a passometer, or the like, and perform a gas spray function for fending off a sexual harasser. The blood glucose level tester 3010-6 may include a sensor for measuring blood glucose of the user 3020. The blood glucose level tester may be a noninvasive sensor. The measured blood glucose may be transmitted to the server 3040 via the smartphone/gateway 125 of the user 3020.

The thermostat clothes 3010-7 may include a sensor for measuring a body temperature or an ambient temperature of the user 3020. The thermostat clothes 3010-7 may compare a given predetermined (or alternatively, desired) temperature to a measured temperature, and thus, control an air conditioning or heating function of the thermostat clothes 3010-7. The thermostat clothes 3010-7 may be, for example, a diaper or underwear for infants or adults. The diaper or underwear may include a skin conduction sensor, a temperature sensor, a test paper detection sensor, or a hydraulic pressure sensor, and may sense a state of the user 3020, and thus, indicate a time point when the diaper or the underwear is to be replaced or perform air conditioning/heating. The diaper or the underwear may include a cooling pipe and/or a thin hot wire for performing air conditioning/heating.

The shoes 3010-8 may include a sensor for measuring a weight of the user 3020, a pressure on each part of a sole of a foot, a degree of air contamination in shoes 3020 of the user 3020, humidity, or a smell, a GPS sensor, or the like. Information gathered by the sensor may be transmitted to the server 3040, and the server 3040 may transmit information about an alarm indicating posture correction of the user 3020, cleaning or replacement of the shoes, or the like to the user 3020. The shoes 3010-8 may provide the information directly to the user 3020 via an application installed in a user smartphone/gateway 3030.

The necklace 3010-9 is worn round a neck of the user 3020, and includes a sensor for sensing respiration, a pulse, a body temperature, or an amount of exercise, consumed calories, a GPS signal, brainwave measurement, voice, EGC, PPG, or the like. The information gathered by the sensor may be analyzed by the IoT device, or transmitted to the server 140. The service provider 3050, 3060, or 3070 may provide a relevant service to the user 3020 based on received user information. For example, the necklace 3010-9 may be worn by a pet dog, and sense voice of the pet dog.

Then, a service provider may provide a voice translation service based on information obtained by the sensing. Information obtained from the voice translation service may be played via a microphone equipped in the necklace 3010-9.

The example embodiment described with reference to FIG. 15 shows usage scenarios about health, smart home, and leisure activities. However, according to example embodiments, the IoT service system 3000 is not limited thereto, and may be used in various industries. For example, the IoT service system 3000 may provide services such as e-commerce, logistics processing, building management, or the like.

While inventive concepts have been particularly shown and described with reference to example embodiments thereof, it will be understood that various changes in form and details may be made therein without departing from the spirit and scope of the following claims. Accordingly, the scope of inventive concepts is determined by the claims and their equivalents.

What is claimed is:

1. An electronic device comprising;
   an internal power supply configured to supply power to a controller and a memory,
   an external power supply detachably attached to the electronic device, the external power supply configured to supply power to the internal power supply,
   wherein the memory includes a volatile memory and a non-volatile memory, and
   wherein the controller is configured to execute computer readable instructions to,
      measure a value of supply power from the internal power supply to the memory,
      load data stored in the non-volatile memory onto the volatile memory, if the measured value of the supply power to the memory is equal to or greater than a threshold value, and
      store data related to operation of the electronic device in the non-volatile memory if the measured value of the supply power to the memory is less than the threshold value.

2. The electronic device of claim 1,
   wherein the controller and the memory are further configured to operate based on the internal power supply.

3. The electronic device of claim 1,
   wherein the measuring the value of the supply power from the internal power supply to the memory comprises:
      measuring a remaining charge of the internal power supply after the controller and the memory begin to operate in a low frequency mode based on the internal power supply.

4. The electronic device of claim 1,
   wherein the data related to operation of the electronic device includes processed data by the volatile memory or temporarily stored data in the volatile memory.

5. The electronic device of claim 1,
   wherein the measuring the value of the supply power from the internal power supply to the memory comprises:
      measure a remaining charge of the internal power supply if the external power supply is discharged or separated from the electronic device.

6. The electronic device of claim 1, wherein the memory is further configured to operate in a low frequency mode if the external power supply is discharged or detached from the electronic device.

7. The electronic device of claim 6, wherein the memory operates at a minimum frequency in the low frequency mode.

8. The electronic device of claim 6, wherein the memory is further configured to operate in normal frequency mode if the external power supply is charged or reconnected to the electronic device.

9. The electronic device of claim 6, wherein
the controller is further configured to execute the computer readable instructions to measure an elapsed time after the memory begin to operate in the low frequency mode, and
the internal power supply is further configured to supply power to at least one function module included in the electric device if (i) the measured elapsed time is equal to or greater than a threshold time period, and (ii) a remaining charge of the internal power supply is equal to or greater than a threshold level, wherein the at least one function module operates based on the external power supply before the external power supply is discharged or separated from the electronic device.

10. The electronic device of claim 9, wherein the volatile memory includes a Dynamic Random Access Memory.

11. An operating method of an electronic device including an internal power supply and an external power supply detachably attached to the electronic device, the method comprising:
operating a memory included in the electronic device based on the internal power supply, wherein the memory includes a volatile memory and a non-volatile memory;
measuring a value of supply power from the internal power supply to the memory;
loading data stored in the non-volatile memory onto the volatile memory, if the measured value of the supply power to the memory is equal to or greater than a threshold value; and
storing data related to operation of the electronic device in the non-volatile memory if the measured value of the supply power to the memory is less than the threshold value.

12. The method of claim 11, wherein the operating of the memory comprises:
operating the memory in a low frequency mode if the external power supply is discharged or separated from the electronic device.

13. The method of claim 12, wherein the measuring the value of the supply power from the internal power supply to the memory comprises:
measuring a remaining charge of the internal power supply if the external power supply is discharged or separated from the electronic device.

14. The method of claim 12, further comprising:
operating the memory in normal frequency mode if the external power supply is charged or reconnected to the electronic device.

15. The method of claim 12, further comprising:
charging the internal power supply by the external power supply.

16. An operating method of a memory device included in an electronic device, wherein the memory includes a volatile memory and a non volatile memory, the method comprising;
operating the memory based on power provided from a first power supply among the first power supply and a second power supply included in the electronic device, wherein the first power supply being embedded into the electronic device and the second power supply being detachably attached to the electronic device;
loading stored data in the non-volatile memory onto the volatile memory, if remaining charge of the first power supply is equal to or greater than a threshold value; and
storing data related to operation of the electronic device in the non-volatile memory if remaining charge of the first power supply is less than the threshold value.

17. The method of claim 16, wherein the operating of the memory comprises:
operating the memory in a low frequency mode if the second power supply is discharged or detached from the electronic device.

18. The method of claim 17, wherein
the remaining charge of the first power supply is measured after the memory begin to operate in the low frequency mode based on the first power supply.

19. The method of claim 17, further comprising:
operating the memory in normal frequency mode if the second power supply is charged or reconnected to the electronic device,
wherein an operating frequency of the memory in the low frequency mode is less than an operating frequency of the memory in the normal frequency mode.

20. The method of claim 16, wherein the data related to operation of the electronic device includes processed data by the volatile memory or temporarily stored data in the volatile memory.

* * * * *